(12) United States Patent
Di Blas et al.

(10) Patent No.: US 9,582,488 B2
(45) Date of Patent: Feb. 28, 2017

(54) TECHNIQUES FOR VALIDATING HIERARCHICALLY STRUCTURED DATA CONTAINING OPEN CONTENT

(71) Applicant: Oracle International Corporation, Redwood Shores, CA (US)

(72) Inventors: Andrea Di Blas, San Francisco, CA (US); Mayssam Sayyadian, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 483 days.

(21) Appl. No.: 13/770,200

(22) Filed: Feb. 19, 2013

(65) Prior Publication Data

US 2014/0237345 A1 Aug. 21, 2014

(51) Int. Cl.
*G06F 17/00* (2006.01)
*G06F 17/27* (2006.01)

(52) U.S. Cl.
CPC .............................. *G06F 17/2725* (2013.01)

(58) Field of Classification Search
CPC .................... G06F 17/2725; G06F 17/2247
See application file for complete search history.

(56) References Cited

U.S. PATENT DOCUMENTS

| | | | |
|---|---|---|---|
| 5,434,962 A | 7/1995 | Kyojima et al. | |
| 6,138,120 A | 10/2000 | Gongwer et al. | |
| 6,826,726 B2 | 11/2004 | Hsing et al. | |
| 7,051,016 B2 | 5/2006 | Winkler | |
| 7,143,344 B2 | 11/2006 | Parker et al. | |
| 7,293,038 B2 | 11/2007 | Blevins et al. | |
| 7,480,859 B2 | 1/2009 | Mani et al. | |
| 7,493,305 B2 | 2/2009 | Thusoo et al. | |
| 7,512,878 B2 | 3/2009 | Shur et al. | |
| 7,614,052 B2 | 11/2009 | Wei | |
| 7,707,492 B2 | 4/2010 | Zaharkin | |
| 7,765,467 B2 | 7/2010 | Malek et al. | |
| 7,797,622 B2 | 9/2010 | Dejean et al. | |
| 7,810,024 B1 | 10/2010 | Goldman | |
| 7,831,620 B2 | 11/2010 | Barsness et al. | |
| 7,882,149 B2 | 2/2011 | Foster et al. | |

(Continued)

FOREIGN PATENT DOCUMENTS

CN 1704932 A 12/2005
CN 101300577 A 11/2008

OTHER PUBLICATIONS

U.S. Appl. No. 13/221,832, filed Aug. 30, 2011, Notice of Allowance, Nov. 17, 2014.
U.S. Appl. No. 13/221,832, filed Aug. 30, 2011, Final Office Action, Jul. 17, 2013.
U.S. Appl. No. 13/923,033, filed Jun. 20, 2013, Office Action, May 5, 2014.
U.S. Appl. No. 13/221,832, filed Aug. 30, 2011, Notice of Allowance, Jun. 2, 2014.

(Continued)

*Primary Examiner* — Scott Baderman
*Assistant Examiner* — Matthew G McVicker
(74) *Attorney, Agent, or Firm* — Hickman Palermo Becker Bingham LLP; Marcel K. Bingham

(57) ABSTRACT

Techniques for validating hierarchically structured data according to a collected hierarchical object rule set. The validation techniques account for any open content in the hierarchical object and any downscoped rules in the hierarchical object rule set. In addition, the validation techniques can be applied to efficiently identify rules in the hierarchical object rule set that fail during validation and the nodes of the hierarchical object that cause those rules to fail.

23 Claims, 12 Drawing Sheets

(56) References Cited

U.S. PATENT DOCUMENTS

| | | | |
|---|---|---|---|
| 7,904,326 | B2 | 3/2011 | Gharavy |
| 7,958,077 | B2 | 6/2011 | Vescovi et al. |
| 7,974,966 | B2 | 7/2011 | Robie |
| 8,117,533 | B2 | 2/2012 | Adler et al. |
| 8,176,563 | B2 | 5/2012 | Redlich et al. |
| 8,356,079 | B2 | 1/2013 | Basu et al. |
| 8,515,988 | B2 | 8/2013 | Jones et al. |
| 8,560,564 | B1 | 10/2013 | Hoelzle et al. |
| 8,566,096 | B2 | 10/2013 | Bangalore et al. |
| 8,661,332 | B2 | 2/2014 | Dunietz et al. |
| 8,850,309 | B2 | 9/2014 | Fablet et al. |
| 2002/0010715 | A1 | 1/2002 | Chinn et al. |
| 2002/0147652 | A1 | 10/2002 | Gheith et al. |
| 2003/0028557 | A1 | 2/2003 | Walker et al. |
| 2003/0074636 | A1 | 4/2003 | Manepalli |
| 2004/0226002 | A1* | 11/2004 | Larcheveque et al. ....... 717/126 |
| 2005/0076030 | A1 | 4/2005 | Hada et al. |
| 2005/0203957 | A1 | 9/2005 | Wang et al. |
| 2005/0246716 | A1 | 11/2005 | Smith et al. |
| 2006/0167905 | A1 | 7/2006 | Liu et al. |
| 2007/0250527 | A1 | 10/2007 | Murthy et al. |
| 2008/0028376 | A1* | 1/2008 | Kostoulas et al. ............ 717/143 |
| 2008/0059505 | A1 | 3/2008 | Kalia et al. |
| 2008/0235251 | A1* | 9/2008 | Shmueli et al. .............. 707/100 |
| 2009/0119316 | A1 | 5/2009 | Bakker et al. |
| 2009/0129396 | A1 | 5/2009 | Bakker et al. |
| 2010/0070500 | A1 | 3/2010 | Cui et al. |
| 2010/0299356 | A1* | 11/2010 | Sedlar et al. ................. 707/769 |
| 2011/0173528 | A1 | 7/2011 | Zunger |
| 2011/0213783 | A1 | 9/2011 | Keith |
| 2012/0323919 | A1 | 12/2012 | Alba et al. |
| 2013/0007068 | A1 | 1/2013 | Pitschke |
| 2013/0007070 | A1 | 1/2013 | Pitschke |
| 2013/0055065 | A1 | 2/2013 | Di Blas et al. |
| 2013/0086462 | A1 | 4/2013 | De Cerqueira Gatti et al. |
| 2013/0219017 | A1 | 8/2013 | Bakker et al. |
| 2013/0346438 | A1 | 12/2013 | Sedlar et al. |

OTHER PUBLICATIONS

Bouottaya et al., Schema Matching for Transforming Structured Documents, AMC, 2005, 10 pages.
U.S. Appl. No. 13/221,832, filed Aug. 30, 2011 Office Aciton, Dec. 3, 2013.
Dekeyser Stjin et al., "Conflict Scheduling of Transactions on XML Documents", dated 2004, 10 pages.
Oasis, "Oasis Content Assembly Mechanism Specification Version 1.1", Committee Specification Draft 02, dated Feb. 26, 2007, 62 pages.
Kathuria et al., IBM, XML Validation Framework Using OASIS CAM, dated May 11, 2010, 16 pages.
Carey et al., IBM, "Meet Cam: A New XML Validation Technology" dated Sep. 22, 2009, 10 pages.
CAM Content Assembly Mechanism, "Executive Overview", Oasis Business Transaction Information Management, 8 pages, dated Jul. 6, 2011.
Simov et al., Constraints for Corpora Development and Validation, Google, dated 2003, 8 pages.
Gasch et al., Memasysco: XML Schema Based Metadata Management System for Speech Corpora, Google dated 2008, 6 pages.
U.S. Appl. No. 12/782,591, filed May 5, 2010, Notice of Allowance, Jan. 17, 2013.
U.S. Appl. No. 13/923,033, filed Jun. 20, 2013, Notice of Allowance, Aug. 18, 2014.
Chamberlin et al., XQueryP: "An XML Application Development Language", dated Dec. 31, 2006, 14 pages.
Christian Tarnutzer, "Streaming XQuery P", Databases and Information Systems Group, Department of Computer Science ETH Zurich, dated Dec. 12, 2008, 114 pages.
Chamberlin et al., "XQueryP: Programming with XQuery", XIME-P 2006: $3^{rd}$ International Workshop on XQuery Implementation, dated Jun. 30, 2006, 7 pages.

* cited by examiner

FIG. 7

```
701  schedule()
702  {
703    for (each calculation calc)      /* init stage flags */
704      calc.stage = -1;
705
706    for (each calculation calc)
707      scheduleRec(calc);
708  }
709
710  scheduleRec(calc)         /* return highest stage found */
711  {
712    if (calc.stage < 0)
713    {
714      if (calc has no dependencies)
715      {
716        calc.stage = 0;
717        return(0);
718      }
719      for (each calc's dependency dep)
720      {
721        dep.stage = scheduleRec(dep);
722        if(dep.stage + 1 > calc.stage)
723          calc.stage = dep.stage + 1;
724      }
725      return(calc.stage);
726    }
727  }
```

FIG. 9

```
901  if (rule failed for thisNode as an instance of thisElement)
902  {
903      error flag = CHECKED_AND_FAILED;
904      errorBackProp(thisElement, rule, thisNode);
905  }
906  else if (error == NEVER_CHECKED)
907      error flag = CHECKED_AND_PASSED;
908  }
```

FIG. 10

```
1001  errorBackProp(thisElement, rule, thisNode)
1002  {
1003    for (each setByElement in thisElement's rule's setBy list)
1004    {
1005       setByNode = findAncestorNode(setByElement, thisNode);
1006       setByRule = findAncestorRule(setByElement, rule);
1007       add setByNode to setByElement's rule's INlist;
1008       setByElement.error = CHECK_AND_FAILED;
1009       errorBackProp(setByElement, setByRule, setByNode);
1010    }
1011  }
```

TECHNIQUES FOR VALIDATING HIERARCHICALLY STRUCTURED DATA CONTAINING OPEN CONTENT

CROSS-REFERENCE TO RELATED APPLICATIONS

This application is related to U.S. patent application Ser. No. 13/221,832, filed Aug. 30, 2011, the entire content of which is hereby incorporated by reference for all purposes as if fully set forth herein. This application is related to U.S. patent application Ser. No. 12/782,591, filed on May 18, 2010, the entire content of which is hereby incorporated by reference for all purposes as if full set forth herein.

FIELD OF THE INVENTION

The present invention relates to hierarchically structured data and, more particularly, to computer-implemented techniques for validating hierarchically structured data containing open content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Hierarchically Structured Data

The use of hierarchical mark-up languages for structuring and describing data is finding wide acceptance in the computer industry. One example of a mark-up language is the extensible markup language (or just "XML").

Data structured using a hierarchical mark-up language is composed of nodes. Nodes are delimited by a pair of corresponding start and end tags, which not only delimit the node, but also specify the name of the node. For example, in the following structured data fragment, <A><B>5<C>7</C></B><D>10</D></A>, the start tag <A> and the end tag </A> delimit a node having name A.

The data between the corresponding tags is referred to as the node's content. A node's content can either be one or more scalar values (e.g., integer, text string, etc.), one or more other nodes, or a mix of one or more scalar values and one or more other nodes. A node is either a scalar node or a structured node. A node that contains only a scalar value and does not contain other nodes is referred to herein as a scalar node. A node that contains one or more other nodes or a mix of one or more scalar values and one or more other nodes is referred to herein as a structured node.

A structured node thus forms a hierarchy of nodes with multiple levels, the structured node being at the top level. A node at each level is linked to one or more nodes at a different level. Each node at a level below the top level is a child node of a parent node at the level above the child node. Nodes having the same parent are sibling nodes. A parent node may have multiple child nodes. A node that has no parent node is a root node, and a node that has no child nodes is a leaf node.

For example, in structured node A, node A is the root node at the top level. Structured nodes B and D are descendant and children nodes of node A, and with respect to each other, nodes B and D are sibling nodes. Scalar node 5 and structured node C are descendant and children nodes of node B, and with respect to each other, nodes 5 and C are sibling nodes. Nodes 5 and C are descendant, but not children nodes, of node A. Scalar node 7 is a descendant and child node of node C. Node 7 is a descendant, but not a child node, of nodes B and A. Scalar node 10 is a descendant and child node of node D. Node 10 is a descendant, but not a child node, of node A.

Viewing structured node A bottom up, node C is an ancestor and parent node of node 7. Node B is an ancestor and parent node of nodes 5 and C. Node B is an ancestor, but not a parent node, of node 7. Node D is an ancestor and parent node of node 10. Node A is an ancestor and parent node of nodes B and D. Node A is an ancestor, but not a parent node, of nodes 5, C, 7, and 10.

Hierarchically Structured Data Objects

The term "hierarchically structured data object", or just "hierarchical object" is used herein to refer to a collection one or more hierarchically arranged nodes in which there is exactly one root node in the collection and each other node in the collection has exactly one parent node. For example, the structured data fragment <A><B>5<C>7</C></B><D>10</D></A> is a hierarchical object because the fragment has exactly one root node (i.e., node A) and each other node in the fragment (i.e., structured nodes B, C, and D and the scalar nodes 5, 7, and 10) has exactly one parent node. A hierarchical object may be stored in computer memory in various data formats. For example, a hierarchical object may be stored as a text file, or a hierarchical object may be stored in an XML database in a Large Object (LOB) column of a row, or as a web page accessible as a resource on the Internet, as just some examples.

Hierarchical Object Schemas

It is sometimes very important to create hierarchical objects that conform to structures and constraints that computing devices are configured to handle. A hierarchical object schema (or just schema) is a set of rules that constrain structure and content of hierarchical objects. A hierarchical object that conforms to a schema is referred to herein as a valid hierarchical object and as an instance of the schema.

Generally speaking, a schema is a set of rules for structure and constraints for units of data. The term schema is used herein both to refer to a single schema, i.e. rules for a single type of unit of data, or to a collection of schemas, each defining a different type of unit of data. For example, the term schema may refer to multiple hierarchical object schemas or to a single hierarchical object schema.

Schemas and the rules therein can be expressed using schema declarations. Schema declarations are expressions that, according to a schema standard and/or language, define a schema rule.

A schema standard used for XML hierarchical objects is XML Schema. Standards governing XML schemas include: XML Schema, Part 0, Part 1, Part 2, W3C Recommendation, 2 May 2001; XML Schema Part 1: Structures, Second Edition, W3C Recommendation 28 Oct. 2004; XML Schema 1.1 Part 2: Datatypes, W3C Working Draft 17 Feb. 2006; and XML Schema Part 2: Datatypes Second Edition, W3C Recommendation 28 Oct. 2004, the contents of each of which is incorporated herein by reference. XML Schemas as described in this disclosure are not restricted to W3C XML Schemas but include any other mechanisms for describing the structural and/or typing information of XML hierarchical objects, for example, Relax NG.

XML Schema provides for a type of schema referred to herein as a "hierarchical object-centralized schema".

Validation

Generally, validation mechanisms that have been developed are adept at validating a hierarchical object against a hierarchical object-centralized schema. However, not all forms of schemas are hierarchical object-centralized, such as the decentralized form described in related U.S. patent application Ser. No. 12/782,591, filed on May 18, 2010 and referred to hereinafter as the "XAP schema". A validation mechanism adept at validating a hierarchical object against a decentralized schema, such as the XAP schema, is described in related U.S. patent application Ser. No. 13/221,832, filed Aug. 30, 2011.

The term "validation" is used herein is used to refer to both validation of a hierarchical object against a hierarchical object-centralized schema and validation of a hierarchical object against a decentralized schema. For example, the term validation may refer to the process of determining whether a hierarchical object conforms to a hierarchical object-centralized schema or a decentralized schema.

Open Content

The term "open content" is used herein to refer to nodes of a hierarchical object that do not need to conform to the schema against which the hierarchical object is validated in order for the hierarchical object as a whole to be considered a "valid" hierarchical object.

It is useful to be able to validate a hierarchical object containing open content nodes in some business contexts, for example. For example, a widget selling business may want to be able to determine whether a hierarchical object is a valid purchase order even if that hierarchical object contains information that does not conform to a schema defining a valid purchase order. The widget selling business may want this ability so that valid purchase order hierarchical objects can contain ancillary information (e.g., widget shipping information) that is not required of a valid purchase order. For example, the ancillary information may be processed by other hierarchical object processors used by the business (e.g., a widget shipping processing computer). The business may also want this ability so that modification to the schema defining a valid purchase order to account for the ancillary information is not required in order detect and process valid purchase order hierarchical objects.

Based on the foregoing, there is a need for techniques and mechanisms for efficiently validating a hierarchical object containing open content nodes. In particular, there is a need for techniques and mechanisms for efficiently validating a hierarchical object containing open content nodes against a decentralized schema such as, for example, the XAP schema. The techniques and mechanisms should be able to determine which descendant nodes of the root node are open content nodes and which are not open content nodes. In addition, the techniques and mechanism should be able to account for the possibility that a rule of the decentralized schema may apply to multiple nodes and some of those nodes may fail the rule while others of the nodes may not fail the rule. The present invention fulfills these and other needs.

BRIEF DESCRIPTION OF THE DRAWINGS

In the drawings:

FIG. 7 is pseudo code describing an algorithm for partitioning calculations into stages according to an embodiment.

FIG. 9 is pseudo-code described an algorithm for updating error flags associated with rules in the hierarchical rules collection data structures according to an embodiment.

FIG. 10 is pseudo code describing a recursive algorithm for propagating node failures towards the root node taking into account multiple ancestries and open content nodes according to an embodiment.

DETAILED DESCRIPTION

Introduction

Figure 1A:
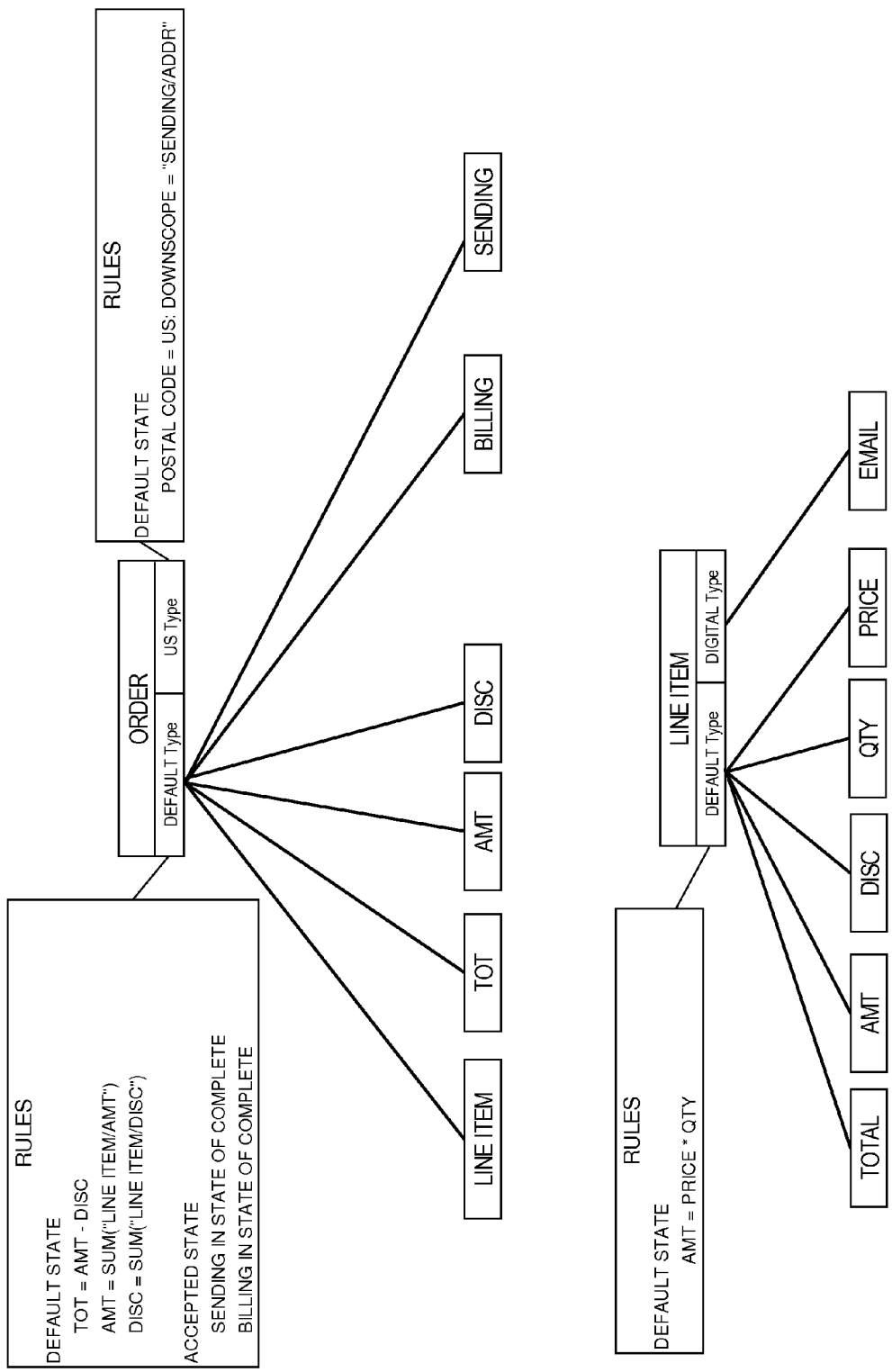
FIGS. 1A and 1B are diagrams depicting element with types and states according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first node could be termed a second node, and, similarly, a second node could be termed a first node, without departing from the scope of the present invention. The first node and the second node are both nodes, but they are not the same node, unless otherwise clearly indicated.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises"

and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Overview of Hierarchical Object Validation

Computer-implemented techniques and mechanisms for efficiently validating a hierarchical object containing one or more open content nodes are disclosed. According to some embodiments of the hierarchical object validation process described herein, the hierarchical object is validated against a certain model of a decentralized schema that contains one or more "elements". The term "element" is used hereinafter to refer to a type description in the model. This definition of "element" should not be confused with the definition conventionally ascribed to "element" by the XML community, which is that an element is a node in a hierarchical object.

An element in the model may have one or more business rules (or just "rules") that apply to one or more nodes of the hierarchical object. The nodes of the hierarchical object to which the rules apply are referred to herein as instances of the element.

In some embodiments, a node declares the element that it is an instance of. For example, the node's name may refer to the name of the element that it is an instance of. For example, the structured data fragment <ORDER> . . . </ORDER> declares node ORDER to be an instance of element ORDER. Note that even though node ORDER may be unambiguously an instance of element ORDER, it is not necessarily a valid instance of an ORDER element. Whether node ORDER is a valid instance of element ORDER depends on whether the node satisfies the rules that apply to it as an instance of element ORDER.

In some embodiments of the model, a rule of an element is one of two different types. A first type of rule is referred to herein as a "calculation". As one example, the calculation TOTAL=AMOUNT−DISCOUNT sets the value of a scalar node that is an instance of a TOTAL element to the result of subtracting the value of a scalar node that is an instance of a DISCOUNT element from the value of a scalar node that is an instance of an AMOUNT element. A second type of rule is referred to herein as a "constraint". As one example, the constraint POSTAL CODE=US requires the value of a scalar node that is an instance of a POSTAL CODE element to be the string value US.

For the purpose of providing clear examples, a node that is an instance of a particular element may be described hereinafter as a "[particular element] node", where [particular element] is the name of the element. For example, a POSTAL CODE node refers to a node that is an instance of a POSTAL CODE element.

Validation of the hierarchical object is performed to both update the hierarchical object with the results of the calculations and to ensure the hierarchical object is well-formed according the constraints. A result of validation is a determination of whether the hierarchical object is valid or invalid.

Overview of Constraints

According to an axiom of the hierarchical object validation process disclosed herein, the hierarchical object is considered to be a valid hierarchical object if the root node is valid. The root node is valid only if the rules that apply to the root node are satisfied. Among the rules that apply to the root node can be a constraint on a child node of the root node. More generally, among the rules that apply to a parent node can be a constraint on a child node of the parent node. If a constraint is not satisfied, then both child node and the parent node are invalid.

For example, consider a constraint that applies to the root node as an instance of an ORDER element that requires any child nodes of the root node that are instances of a LINE ITEM element to be valid LINE ITEM element instances. If the root ORDER node has a child LINE ITEM node, then, according to the axiom, that child LINE ITEM node must be a valid LINE ITEM element instance in order for the root ORDER node to be valid.

Whether the child LINE ITEM node is a valid LINE ITEM element instance depends, in turn, on any constraints that apply to the child LINE ITEM node as an instance of the LINE ITEM element. For example, a constraint that applies to the LINE ITEM node may require any child nodes of the LINE ITEM node that are instances of a PRICE element to be valid PRICE element instances. Constraints that apply to the PRICE nodes can impose requirements on children nodes of the PRICE nodes, and so on. Thus, as well as the validity of a child node, the validity of the root node may depend on the validity of a non-immediate descendant node of the root node (i.e., a non-child descendant node) arbitrarily far down in the hierarchy of nodes by a unbroken chain of constraints that connects the root node to the child node to a grandchild node to a great-grandchild node and so on, down to the descendant node.

In some instances, a constraint does not require the existence (or non-existence) of a child node that is an instance of the element specified in the constraint. Instead, the constraint requires just that if the child node does exist, it must be a valid instance of the specified element. For example, consider again the constraint above that applies to the root ORDER node. The constraint may not require the root ORDER node to have any child LINE ITEM nodes. However, if the root ORDER node does have one or more child LINE ITEM nodes, then each of those LINE ITEM nodes must be valid LINE ITEM element instances in order to satisfy the constraint.

In other instances, a constraint includes a cardinality constraint. The cardinality constraint may require the existence (or non-existence) of a specified number of child nodes that are valid instances of a specified element. In order for the constraint to be satisfied, the specified number of child nodes must exist and each of those child nodes may be valid instances of the specified element. For example, a constraint that applies to the root ORDER node may require at least one valid child LINE ITEM node in order for the root node to be valid.

In yet other instances, a constraint is only a cardinality constraint. In these instances, in order for the constraint to be satisfied, just the specified number of child nodes must exist regardless of whether those child nodes are valid element instances. For example, a constraint that applies to the root ORDER node may require exactly one child LINE ITEM node. The one child LINE ITEM node can be a valid or invalid LINE ITEM element instance.

Overview of Downscoped Constraints

Also among the rules that can apply to the root node can be a constraint that applies to a descendant node of the root node. More generally, among the rules that can apply to an ancestor node can be a constraint that also applies to a descendant node of the ancestor node. This type of constraint is referred to hereinafter as a "downscoped constraint". In effect, a downscoped constraint is a constraint that, instead of constraining only child nodes of an ancestor node to which the constraint applies, can constrain one or more descendant nodes of the ancestor node.

For example, a downscoped constraint may express the business requirement of a valid purchase order hierarchical object that if the purchase order has shipping information it must be for shipping to the United States. For example, a downscoped constraint that applies to the root ORDER node may require any great-grandchildren COUNTRY nodes having a parent SHIPPING node to have the value US. Here, the root ORDER node is the ancestor node to which the downscoped constraint applies. Through downscoping, the constraint also applies to the SHIPPING nodes to require any child COUNTRY nodes of the SHIPPING nodes to have the value US. Note that because the constraint is downscoped, the constraint does not require any child COUNTRY nodes of the root ORDER node to have the value US. A downscoped constraint may also include a cardinality constraint.

According to some embodiments of the validation process, if a constraint downscoped by the root node to a descendant node is not satisfied, then both the descendant node and the root node are invalid. More generally, if a constraint downscoped by an ancestor node to a descendant node is not satisfied, the both the descendant node and the ancestor node are invalid. For example, consider the downscoped constraint above. If one of the SHIPPING nodes has a child COUNTRY node with a value other than US, then that SHIPPING node is invalid and the root node is also invalid.

Elements and Decentralized Schema

An advantage of a mark-up language is that tags that are used to structure a hierarchical object may be given names that are descriptive of the tag's content to humans. An "element" extends the descriptive power of tags to computing devices. As the term is used, an "element" associates a name with a set of rules declared for the content of the nodes having that name. A node in a hierarchical object having a name of an element is referred to as an instance of the element.

This definition of "element" should not be confused with the definition conventionally ascribed to "element" by the XML community, which is that an element is a node in a hierarchical object.

Within a domain of hierarchical objects, a desirable property is semantic consistency among tags with the same name. To be semantically consistent within a domain of hierarchical objects, nodes that have the same name share one or more central properties, even when the same node name appears in hierarchical objects having different schemas. The semantic consistency may be achieved through the power of a decentralized schema.

In a decentralized schema, a corpus of elements declares schemas for hierarchical objects and nodes in a collection of hierarchical objects. A valid hierarchical object must be a valid element instance of an element in the corpus; the element need not declare that the element defines a hierarchical object schema, as is in the case of a hierarchical object-centralized schema. A valid node within a hierarchical object must at least be a valid instance of the element having the node's name.

While it is important that element instances have consistent properties across a set of hierarchical objects, element instances may need to be further refined for various contexts in which the element instances occur. For example, an element SHIPPING may be defined as a scalar dollar value. It may be useful to devise an order element representing orders with free shipping that can further constrain instances of SHIPPING to zero. A decentralized schema allows such further refinement by allowing a structured element to specify rules that, for any instance of the structured element, apply to descendant element instances contained therein, as shall be further described below Types of Elements There are two main kinds of elements. A scalar element defines the content of a scalar node.

A structured element lists other elements, which are referred to as child elements contained or listed by the structured element. The structured element is referred to as a parent element with respect to the child elements. The structured element defines rules that apply by default to child elements, or more specifically, instances of the child elements within an instance of the structured element.

Figure 1B:
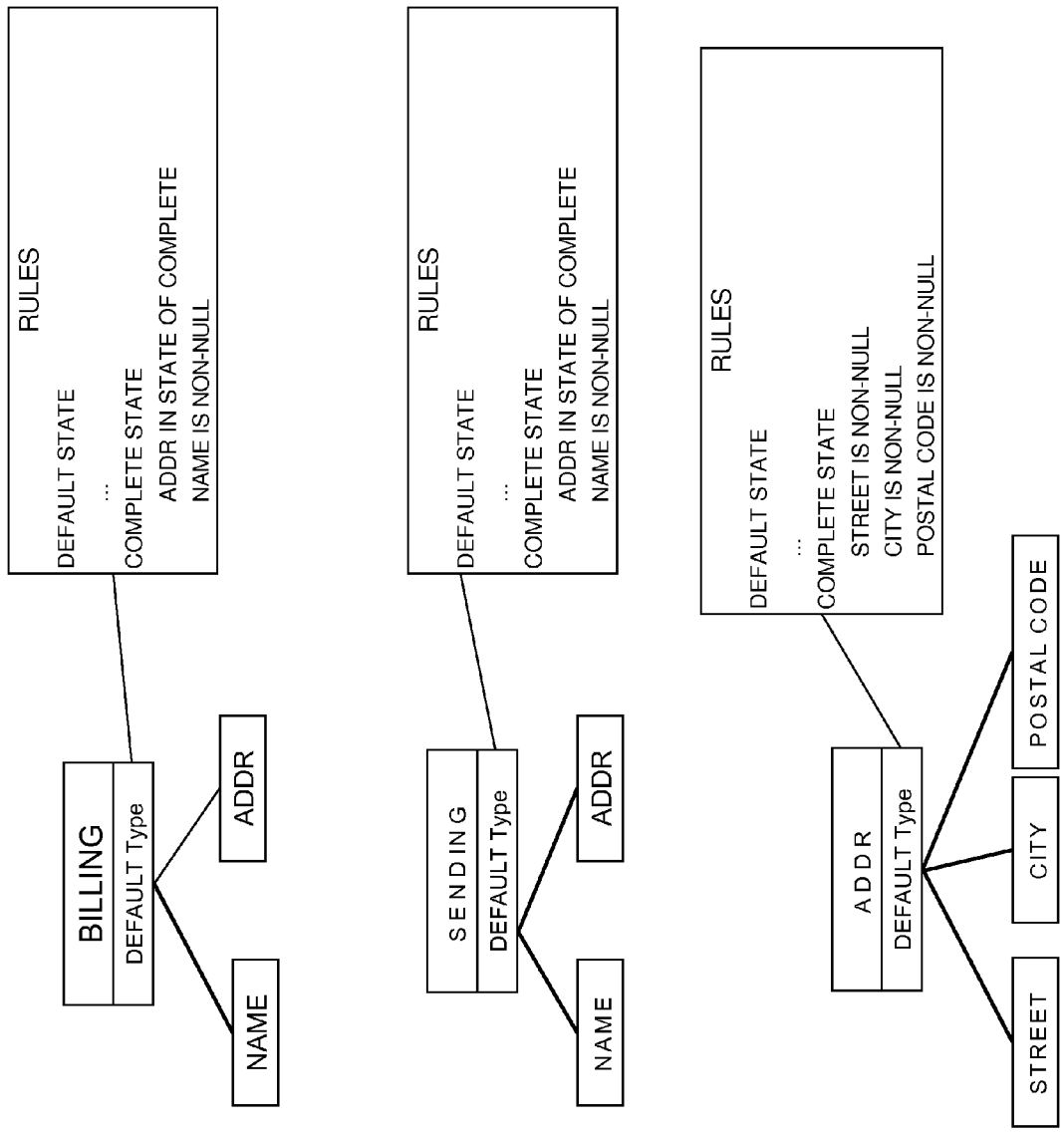

FIGS. 1A-1B depict illustrative elements according to an embodiment. Referring to FIG. 1A, it depicts element ORDER, which represents an order. Element ORDER lists as child elements LINE ITEM, TOT, AMT, DISC, BILLING, and SENDING.

LINE ITEM is a structured element that represents a line item in an order. Element LINE ITEM lists TOT, AMT, and DISC as child elements. These are the same elements listed as children of ORDER. In addition, LINE ITEM lists scalar element QTY and PRICE as child elements Types and States According to an embodiment, structured elements are multiply typed. That is, a structured element's declaration may specify multiple types. According to an embodiment, a structured element has a default type, specifying a base element schema governing all element instances of any of the structured element's declared types. A type for a structured element other than the default type is referred to herein as a non-default type.

Types may be mutable. A mutable type has one or more "type states" or "states." According to an embodiment, each state may define zero or more rules. Every type has a default state. A state for a type other than the default state is referred to herein as a non-default state.

Referring to FIG. 1, element ORDER has two types, the default type and the type US. The default type has two states, the default state and the ACCEPTED state. The default state defines the following calculations: TOT=AMT−DISC, AMT=SUM("LINE ITEM/AMT"), DISC=SUM("LINE ITEM/DISC").

States facilitate development of types that model objects that evolve or transition between stages. A state may be used to represent an object at a particular stage. As an example of use of states, the state ACCEPTED of the default type of ORDER represents orders that have been accepted.

For type US there is one default state. The default state declares a rule that, through "downscoping", constrains descendant element POSTAL CODE instances to a US postal code. Downscoping shall be described later in greater detail.

The default type and default state of LINE ITEM specifies the calculation AMT=PRICE*QTY. LINE ITEM also defines type DIGITAL, representing items than can be delivered digitally. The default state of type DIGITAL lists element EMAIL, representing an email address for delivery of a digital item.

Referring to FIG. 1B, BILLING and SENDING are structured elements. BILLING represents the entity to which an order is billed. SENDING represents the destination to which to ship the order.

Both BILLING and SENDING contain two other elements, scalar element NAME and structured element ADDR. BILLING and SENDING also have a default state with rules (not shown) and a state COMPLETE. The COMPLETE state for both BILLING and SENDING requires that child element instance NAME be a non-null value and that a child element instance ADDR be in a state COMPLETE.

Element ADDR is a structured element that contains three child scalar elements STREET, CITY and POSTAL CODE. Element ADDR has a default state with rules (not shown) and a state COMPLETE. The COMPLETE state includes rules that require child element instances STREET, CITY, and POSTAL CODE be non-null.

Figure 2:
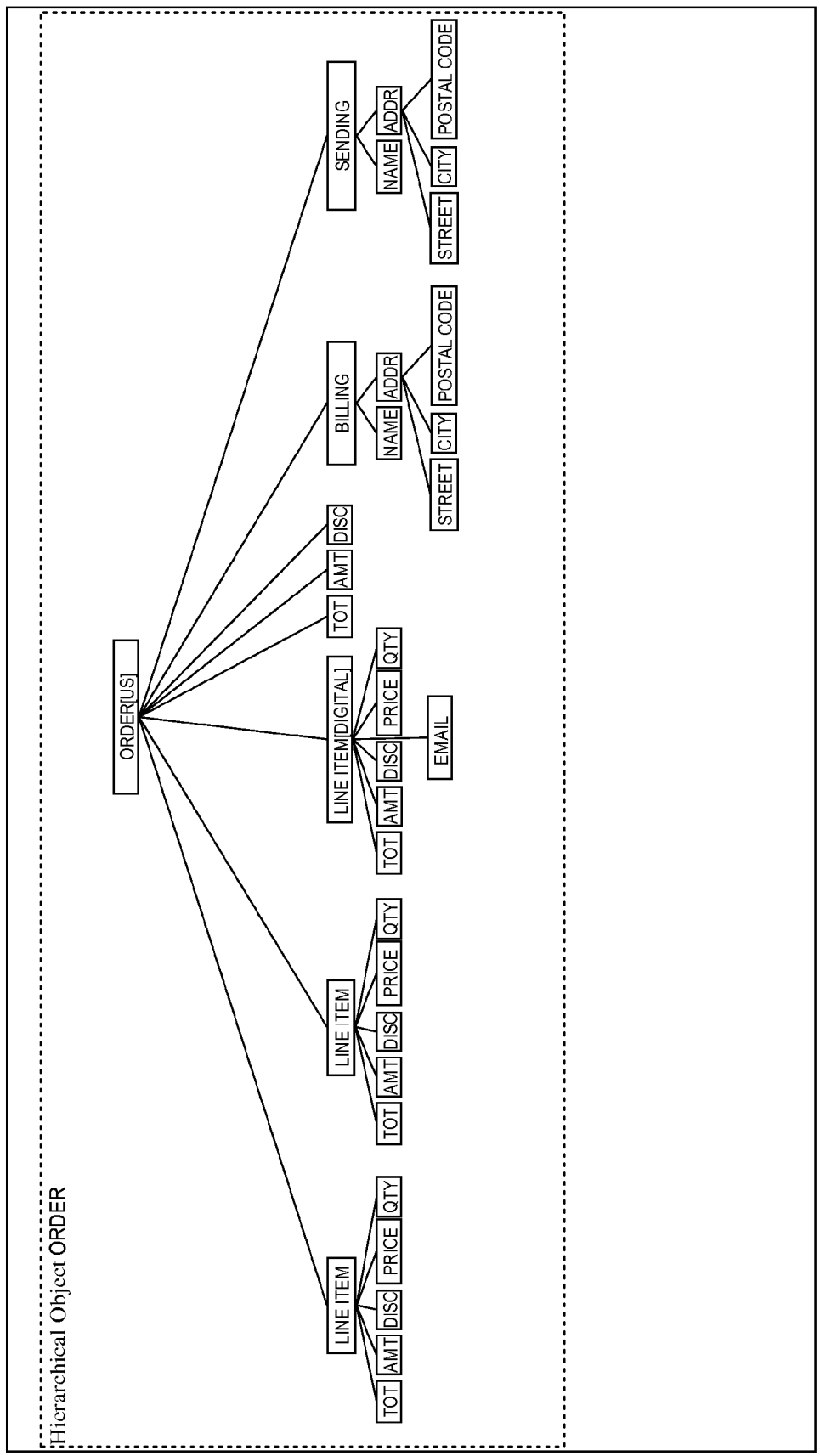
FIG. 2 is a diagram depicting a hierarchical object containing nodes that are instances of elements according to an embodiment of the present invention.

Elements and the rules therein can be expressed using schema declarations. For example, calculations may be declared using the XQuery language. The XAP patent application provides examples of element declarations. It should be understood that embodiments are not limited to any particular language, format, or syntax for specifying paths, constraints or calculations Illustrative Hierarchical Object A hierarchical object may be any instance of a structured element in a corpus of elements. FIG. 2 depicts a hierarchical object ORDER that is an instance of element ORDER of type US. The nodes are referred to by their node name. Of course if the node is an instance of an element, the node name is the name of the element. If the node is an instance of a type other than the default type of the element, the type is designated in a bracket.

Referring to FIG. 2, ORDER[US] is the root node of hierarchical object ORDER. Among the child nodes of ORDER[US] are scalar element instances TOT, AMT, and DISC.

In addition, ORDER[US] contains instances of the default type of element LINE ITEM. Each of these child nodes includes a child instance of a scalar element listed by the default state of LINE ITEM, which are TOT, AMT, DISC, PRICE and QTY.

Another node LINE ITEM[DIGITAL] in ORDER[US] is an instance of the DIGITAL type of element LINE ITEM. Node LINE ITEM[DIGITAL] includes instances of the child elements contained by the default type, which are TOT, AMT, DISC, QTY, and PRICE. In addition, node LINE ITEM[DIGITAL] includes an instance of element EMAIL, which is specific to type DIGITAL.

ORDER[US] also contains node BILLING, an instance of element BILLING, and node SENDING. Both nodes BILL-ING and SENDING are structured nodes that contain the nodes ADDR and NAME. Node ADDR is a structured node that contains child element instances STREET, CITY, and POSTAL CODE Paths and Type-Qualified Paths For a given node, a path is the sequence of element names that comprise (1) each of the zero or more ancestor node names between the given node and a context node and (2) the element name of the given node, referred to herein as the terminal element. Paths are expressed using path expressions. According to an embodiment, a path expression is a sequence of ordered path element names separated by the delimiter "/". For example, in hierarchical object ORDER, assuming that the node BILLING is the context node, the path expression ADDR/CITY represents a path of the node CITY that is the descendant of BILLING.

An absolute path is a path where the context node is the root node. A root node is the one node in a node tree without a parent. In hierarchical object ORDER, ORDER[US] is the root node. In a path expression, an absolute path is expressed by denoting the root node as the context, preceding the element name of the root node with an initial "/". For example, /ORDER/BILLING/ADDR/CITY is an absolute path for node CITY.

A type-qualified path is a path in which each element in the path is qualified by at least one type. According to an embodiment, in a type-qualified path expression for a type-qualified path, the node's type is explicitly identified using a type identifier contained in brackets. The absence of such a bracket for a node name specifies the default type of the node's element.

For example, the type-qualified path expression /ORDER[US]/SENDING/ADDR/CITY identifies node CITY. No node in ORDER[US] is identified by the type-qualified path expression /ORDER/BILLING/ADDR/CITY (note ORDER has no bracketed type identified).

Paths (and path expressions thereof) can identify a node in a hierarchical object. The node identified by a path is a node that has that path. Because multiple nodes may have the same path, a path may identify more than one node. For example, the type-qualified path expression /ORDER[US]/LINE ITEM identifies two nodes in ORDER[US], while /ORDER[US]/LINE ITEM[DIGITAL] identifies one node.

A path not qualified by type may simply be referred to herein as being unqualified. A node is identified by an unqualified path if the name of the node and the zero or more ancestor nodes match the respective name in the path, regardless of the type of which the node or any ancestor is an instance. Thus, the unqualified path /ORDER/LINE ITEM identifies both the nodes named LINE ITEM and the node LINE ITEM[DIGITAL] in hierarchical object ORDER.

Any child or descendant node of a node identified by a path is referred to as a child or descendant of the path. Thus, node EMAIL is a child of the qualified path /ORDER/LINE ITEM[DIGITAL] and of the unqualified path /ORDER/LINE ITEM.

According to an embodiment, a type identifier in a path expression may identify multiple types using pattern matching notation. For example, /ORDER[US]/LINEITEM[*]/ADDR/CITY identifies the city nodes that are descendants of LINEITEM[DIGITAL] and both LINEITEM nodes.

Path expressions may be in any language, format, or standard. For example, paths may be expressed using XPath.

It should be understood that embodiments are not limited to any particular language, format, or syntax for expressing or specifying paths Expression of Rules A rule of a structured element may specify one or more nodes, within an instance of the element, that are subject to the rule for purposes of validation. The one or more nodes are referred to herein as subjects of the rule and as being subjected to the rule, while the rule is referred to as being applicable to or applied to the one or more nodes. For ORDER[US], for the constraint NAME IS NON-NULL of the COMPLETE state of BILLING, the subject is node NAME.

A calculation defines an expression that evaluates to a value for a subject referred to herein as a target. Targets are scalar element nodes. The expression may contain operands that are identified using a relative path expression. For an instance of the element defining the calculation, the context is the path of the element instance. In the case where the target and operand refers to a child element, the relative path expression is simply the child element's name.

For example, LINE ITEM defines the following calculation:

AMT=PRICE*QTY

Defining this calculation for LINE ITEM causes, for each LINE ITEM node in ORDER[US], the AMT child node to equal the result of the calculation PRICE*QTY.

Because a relative path expression is used to refer to an operand, a calculation when operative within an element instance may identify multiple nodes. For example, the element ORDER may define the following calculation:

AMT=SUM("LINE ITEM/AMT")

In ORDER[US], this causes the child node AMT of ORDER[US] to equal the sum of multiple nodes AMT, children of each of the LINE ITEM nodes. Thus, the relative path LINE ITEM/AMT identifies and resolves to the three LINE ITEM nodes (which includes node LINE ITEM [DIGITAL]/AMT).

A node can be subject to rules that are operative within the node's parent element instance. For example, LINE ITEM defines the following calculation AMT=PRICE*QTY. The rule is operative within instances of LINE ITEM. For each instance of LINE ITEM, child node AMT is subject to the calculation as a target of the calculation.

The rules of the default state of the default type of an element are operative within any instance of the element. The rules of the default state of a type are operative within all instances of the type. The rules of a non-default state of a type are inoperative within any instance of a different type or of the same type when validation against that non-default state specifically is not required.

Downscoping

As mentioned previously, it is useful to refine the set of rules to apply to instances of an element beyond those required to be operative by the element definition itself. Downscoping allows a structured element to specify rules that are to be operative within descendant structured element instances of the structured element. Downscoped rules are applied to child element instances of the descendant structured element instances.

For example, the default state of the type US for ORDER declares the downscoped rule POSTAL CODE=US: DOWNSCOPE="SENDING/ADDR", specifying to downscope the rule POSTAL CODE=US according to the downscoping path expression SENDING/ADDR. In ORDER [US], the rule is operative within the child node ORDER [US]/SENDING/ADDR, a non-immediate descendant of ORDER[US], and is applied to the node ORDER[US]/SENDING/ADDR /POSTAL CODE.

A downscoped rule includes a rule and a downscoping clause, which specifies a downscoping path, a relative path that is unqualified or qualified. According to an embodiment, the downscoping path may only be unqualified. In this example, the rule that is downscoped is POSTAL CODE=US and the downscoping clause is DOWNSCOPE="SENDING/ADDR", and the downscoping path is SENDING/ADDR. A downscoped rule causes, for element instances of the element defining the downscoped rule, the rule to be operative within the descendant elements identified by the relative path within the context of the element instance. In the case of hierarchical object ORDER[US], the downscoped rule POSTAL CODE=US: DOWNSCOPE="SENDING/ADDR" causes the rule POSTAL CODE=US to be operative within descendant element instance SENDING/ADDR, the node identified by the downscoping path expression SENDING/ADDR, within the context of element instance ORDER[US].

Like constraints, calculations may also be downscoped.

In a possible embodiment, a rule may be scoped to any other node in the hierarchical object. For example, a rule may be scoped to a descendant node (i.e., downscoping), to a sibling node, to an ancestor node, or any other node of the hierarchical object. The node to which the rule is scoped to may be identified by a relative path or an absolute path starting from the root node.

When Rules of Type or State are Operative or Applicable

There are various ways a rule becomes operative within a structured element instance. A rule may be defined by the structured element's default state of the default type. An element instance may contain an attribute (e.g. XML attribute) that specifies the instance's type, making at least the rules of the default state of the type operative within the element instance.

A rule may become operative when the element instance enters a non-default state which defines the rule. For example, when node order[us]/billing is in the complete state, the rule NAME IS NON-NULL is operative, the rule being declared by the complete state of billing.

A state may be specified in several ways. First, an operative constraint for a parent node of a child element instance may constrain the child element instance to a particular state. For example, in the ACCEPTED state, the rule SENDING IN STATE OF COMPLETE is operative within node ORDER[US]. This constraint constrains node SENDING to the state COMPLETE of element SENDING.

The state of a hierarchical object's root node may be specified by an input state parameter for validation of a hierarchical object. For example, the ACCEPTED state may be specified for ORDER[US] as an input state parameter when invoking validation of the hierarchical object. The rules for the ACCEPTED state of ORDER are operative, as well as the rules for the default state of the default type and the default state of type US.

In this case, passing in the ACCEPTED state as an input parameter has a cascading effect on what rules become operative throughout the hierarchy of nodes in ORDER

[US]. The ACCEPTED state of ORDER[US] constrains nodes SENDING and BILLING to the COMPLETE state, making that state's rules operative, which causes the respective ADDR child nodes in SENDING and BILLING to be in the COMPLETE state and making that state's rules operative Hierarchical Object Rules Collection for Decentralized Schema Under a decentralized schema, hierarchical object rules collection is based on the "hierarchical context" of element instances in the hierarchical object. The hierarchical context for an element instance is the particular absolute path under which an element instance falls in a hierarchical object. Thus, element instances that are nodes identified by the same path share the same hierarchical context.

The element instance's hierarchical context is of paramount importance because the hierarchical context dictates which rules are operative within the element instance. Specifically, which rules are operative depends on the element, type, and state of each ascendant node in the path to the instance. Instances of the same element can have a hierarchical context that varies between different hierarchical objects and even within the same hierarchical object. For two nodes that are instances of the same element but that have a different hierarchical context within a hierarchical object or between hierarchical objects, a different set of rules can be operative therein.

In a decentralized schema, any hierarchical object in the collection of hierarchical objects can be an instance of a structured element, which itself can be comprised of a multitude of instances of a multitude of structured elements. Validation of any particular hierarchical object requires a hierarchical object rule set that includes the rule set operative for each instance of a structured element in the hierarchical object.

Because the rules that are operative for any particular element instance depends on the hierarchical context of the instance, the rule set operative for the element instance is formed when the hierarchical context can be resolved, that is, when the path of the instances can be resolved in the hierarchical object that contains the instances. Thus, determination of a rule set needed for any element instance not only requires reference to the element's declarations in a corpus of elements and but also a determination of the instance's place within the hierarchical structure of a hierarchical object.

According to an embodiment of the present invention, hierarchical object rule set collection is performed on an individual hierarchical object basis when the hierarchical context of any element instance in the hierarchical object is resolvable. The rules are collected by traversing and visiting the nodes of the hierarchical object in depth-first order. In a depth-first ordered traversal, a hierarchical object is traversed starting at a root node, each node is visited, and its children traversed and visited before traversing to a sibling. Visiting a node means that operations are performed with respect to the node. Such operations include examining, collecting, and recording rules from the element of the node from a corpus of elements.

It is important to note that depth-first traversal means that by the time any instance of a structured element is visited, all ancestor nodes have been visited. Thus, any rule downscoped to an instance by an ancestor's element and any state constraint to which the instance is subject, has been encountered and recorded by the time the instance is visited during traversal.

Given an element and a hierarchical object having instances thereof, instances of the element having the same hierarchical context may share the same rule set while instances having a different hierarchical context may not. During the depth-first traversal, rules are collected in effect for each encountered hierarchical context or path of a structured element and stored in data structures associated with the hierarchical context. Once the hierarchical object is traversed and the rules collected, the hierarchical object rules collection data structures have a meta-content and organization customized for the hierarchical object. The rules collected in the hierarchical object rules collection data structures may be further processed and then used to efficiently validate the hierarchical object.

According to some embodiments, the hierarchical object is actually validated by performing a second, subsequent depth-first traversal of the nodes of the hierarchical object after the first-depth traversal is complete and the rules have been collected in the hierarchical object rules collection data structures. During the second depth-first traversal, the rules collected during the first traversal are used to determine the validity/invalidity of each visited nodes and to determine the validity of the hierarchical object as a whole. One possible benefit of performing two depth-first traversals is that rules can be collected by the set of nodes to which the rules apply. Having collected all the rules that apply to a set of nodes during the first traversal, all nodes in the set can be evaluated at once when the first node is in the set is encountered during the second depth first traversal. The set of nodes can be identified by their common type-qualified path. For example, referring to the hierarchical object ORDER of FIG. 2, both nodes at path /ORDER[US]/LINE ITEM can be evaluated at the same time when the first of those nodes is encountered during the second-depth first traversal. When the second of the LINE ITEM nodes is encountered, rule evaluation for the second LINE ITEM node can be skipped as having already been performed when the first LINE ITEM was encountered.

In an alternative embodiment, both rules collection and rule evaluation is performed in a single-depth first traversal. In this case, rules are collected and nodes are evaluated against the collected rules one by one as the nodes are encountered during the traversal.

In the following description, reference is made to a "rules collection traversal" of the nodes of a hierarchical object and a "validation traversal" of the nodes. It should be understood that rules collection traversal and validation traversal may refer to either a single depth-first traversal of the nodes in which both rules collection and rule evaluation is performed or, alternatively, refer to two depth-first traversals of the nodes in which rules collection is performed during the first depth-first traversal of the nodes and rule evaluation is performed during the second-depth first traversal.

While in some embodiments as described in the examples below, the traversal of nodes of the hierarchical object is performed in a depth-first manner, the traversal of nodes is performed in other manners in other embodiments. For example, other traversals can be used when a rule is allowed to be scoped to any other node in the hierarchical object. In such embodiments, any traversal that allows the construction of a complete dependency graph for the rules of all nodes that also allows the detection of cyclical dependencies can be used. Further, in such embodiments, two traversals can be performed. The first traversal can be performed to collect the rules that apply to node of the hierarchical object and second subsequent traversal can be performed to evaluate the nodes against the collected rules.

Hierarchical Object Rules Collection Structures for the Rules Collection and Validation Traversals According to an embodiment of the present invention, hierarchical object rules collection is performed by collecting rules for each hierarchical context corresponding to a type-qualified path of a structured node in a hierarchical object. The rules are collected during the rules collection traversal, as shall be described later in further detail.

Figure 3:
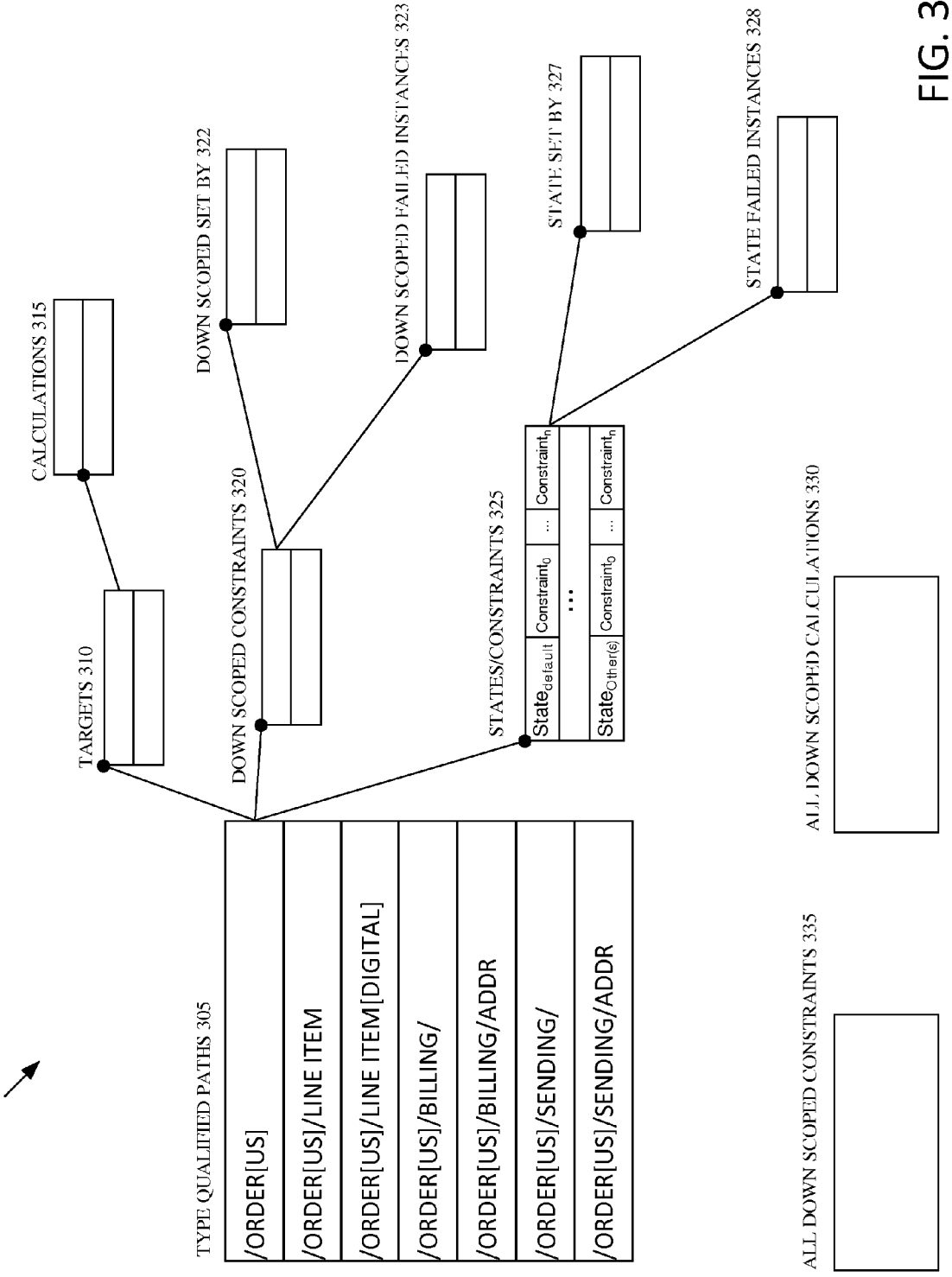
FIG. 3 is a diagram depicting hierarchical object rules collection data structures used to collect rules to validate a hierarchical object according to an embodiment.

FIG. 3 depicts hierarchical object rules collection data structures 301. Referring to FIG. 3, type-qualified paths 305 is a list that contains multiple entries referred to herein as a type-qualified path entry. Each such type-qualified path entry contains rules for a set of nodes in a hierarchical object that share the same type-qualified path in a hierarchical object. Thus, the type-qualified path expression of an entry identifies the nodes in a hierarchical object in which rules in the entry may be operative.

A type-qualified path entry in type-qualified paths 305 is referred to by its associated type-qualified path. Type-qualified path entry /ORDER[US] contains the rules for node ORDER[US], type-qualified path entry /ORDER[US]/LINE ITEM contains rules for both LINE ITEM nodes, type-qualified path entry /ORDER[US]/LINE ITEM[DIGITAL] contains rules for LINE ITEM[DIGITAL], type-qualified path /ORDER[US]/BILLING contains the rules for the so identified instance of BILLING, type-qualified path /ORDER[US]/SENDING contains rules for the so identified instance SENDING, /ORDER[US]/BILLING/ADDR contains rules for the so identified instance of ADDR in ORDER[US], and /ORDER[US]/SENDING/ADDR contains rules for the so identified instance ADDR.

Each type-qualified path entry contains multiple lists that each contain a specific kind of rule. States/constraints 325 contains constraints. The list is subdivided by state, and thus contains one or more state entries. Each state entry contains a sub-list of zero or more constraints. States/constraints 325 contains an entry for the default state, and zero or more others states.

Each state entry contains a state set by list 327, and a state failed instances list 328. State set by list 327 is populated during the rules collection traversal with pointers to the elements that set the constraints of the state entry. State set by list 327 is used during the validation traversal to appropriately propagate state constraint failures towards the root node as explained in greater detail below. State failed instances 328 is a list of nodes that failed a constraint of the state entry. Because multiple nodes of the same element may be present in the same point of the hierarchy, and therefore subject to the state rules, the state failed instances list 328 is used during the validation traversal to track which of the multiple nodes fail the state rules and which do not fail the state rules.

Downscoped constraints 320 contains entries, each containing a constraint downscoped to all nodes of the respective type-qualified path.

Each down scoped entry in downscoped constraints 320 contains a down scoped set by list 322 and a down scoped failed instances list 323 similar to the state set by list 327 and the state failed instances list 328 for each state entry in states/constraints 325. Down scoped set by list 322 is populated during the rules collection traversal with pointers to the elements that set the down scoped constraints. Down scoped set by list 322 is used during the validation traversal to appropriately propagate down scoped constraint failures towards the root node as explained in greater detail below. Down scoped failed instances 323 is a list of nodes that failed a down scoped constraint of the down scoped entry. Because multiple nodes of the same element may be present in the same point of the hierarchy, and therefore subject to the down scoped rules, the down scoped failed instances list 323 is used to track which of the multiple nodes fail the down scoped rules and which do not fail the down scoped rules.

Targets 310 is a list of entries, each containing a calculation's target that is a child of the type-qualified path. For each target in targets 310, there is a calculations list 315 because a target may be the subject of multiple calculations. A target being subject to multiple calculations can create a conflict about which calculation to apply to the target. Such conflicts can be handled using various conflict resolution techniques.

For convenience of expression, a target in targets 310 and calculation in calculations 315 are referred to as being included or contained in a type-qualified path entry that contains targets 310 and calculations 315. Similarly any target, or rule, e.g. calculation or constraint, in a type-qualified path entry is referred to as being contained or belonging to the type-qualified path

Rules Collection Traversal

Figure 4:
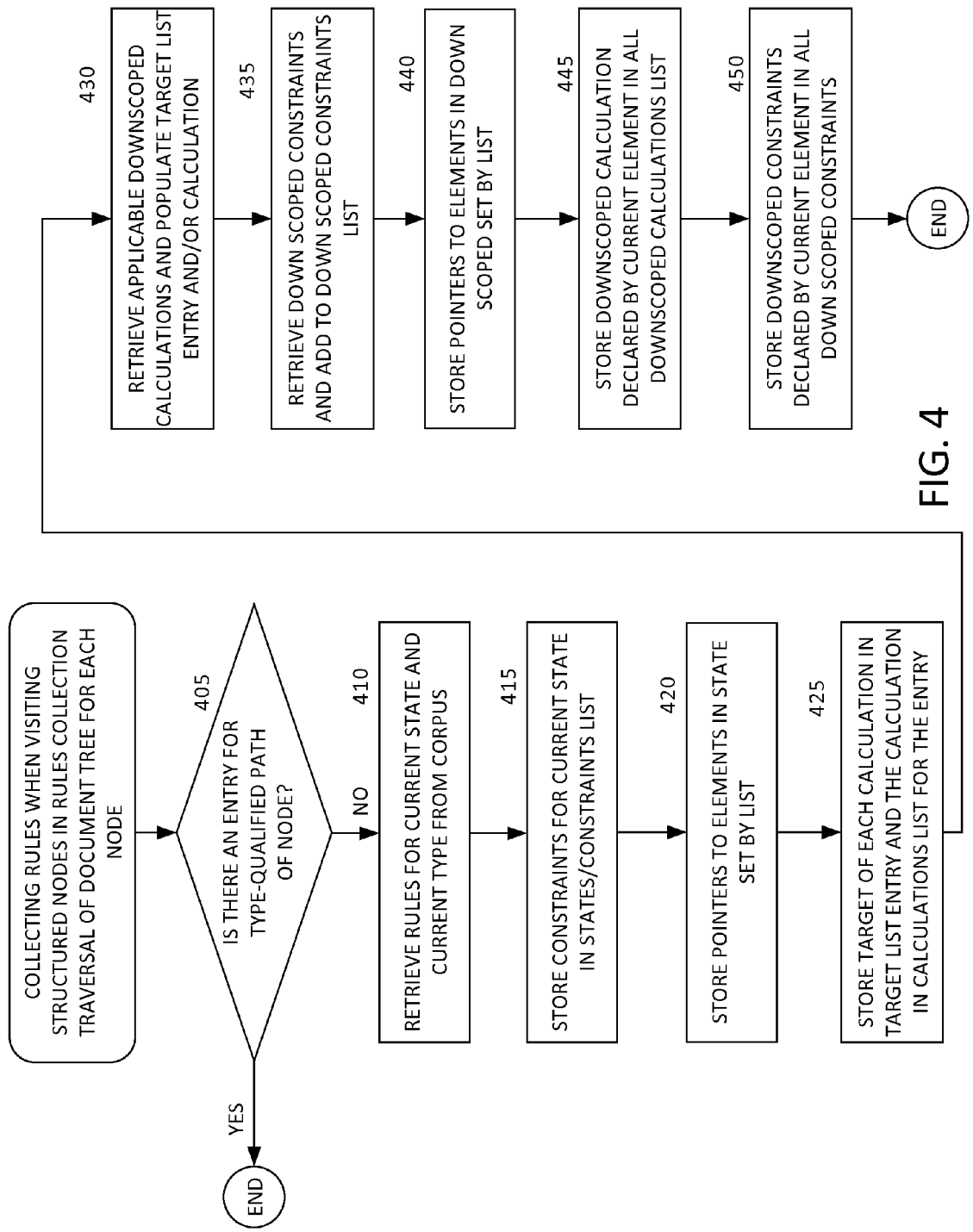
FIG. 4 is a diagram depicting a technique for hierarchical object rules collection for a hierarchical object according to an embodiment.

FIG. 4 shows operations performed when each structured node is visited during the rule collection traversal of a hierarchical object. The operations are bypassed for scalar nodes. The operations are illustrated using hierarchical object ORDER and the hierarchical object rules collection data structures depicted in FIG. 3. In the illustration, the hierarchical object rules collection data structures are not yet populated as depicted. The particular node being visited is referred to as the current node. For purposes of illustration, the input validation state is ACCEPTED.

/ORDER[US] Node

Referring to FIG. 4, the first node traversed is structured node ORDER[US]. It is determined that there is no type-qualified path entry for the type-qualified path /ORDER[US] so one is added (405).

Given the rules for the default state and default type are operative for all instances of an element, the declared rules for the default state and default type of element ORDER are retrieved from the corpus of elements (410). Since the type of the current node ORDER[US] is US, the rules for the default state of type US of element ORDER are also retrieved (410). Because the node ORDER is required to validate against the ACCEPTED state of the default type, the rules for the ACCEPTED state are also retrieved.

The rules retrieved that are constraints are then stored in states/constraints 325 (415) resulting in three state entries. One entry for the default state of the default type of the element ORDER, another entry for the default set of the US type of the element ORDER, and yet another entry for the ACCEPTED state of the default type of the element ORDER.

For each of these three state entries added to states/constraints 325 (415), a pointer to the ORDER element is added (420) to the state set by list 327 for the state entry.

For each rule retrieved that is a calculation, the target of the calculation is added as a target list entry to the targets 310 and the calculation is added to calculations 315 in association with the target list entry (425). For example, ORDER declares the calculation TOT=AMT−DISC. The target of this calculation TOT is added to an entry of targets 310. The calculation is added as an entry to calculations 315, the entry including a pointer or other type of reference to the target list entry for TOT.

Next, calculations downscoped to the current node are retrieved and added to the targets 310 and calculations 315 (430). For ORDER[US], being the first node visited in the depth-first traversal, there are no entries in all downscoped calculations 330.

Likewise, there are no downscoped constraints in all downscoped constraints 335 to add to downscoped constraints 320 (435).

Since there are no downscoped constraints to add downscoped constraints, there are no element pointers to add (440) to a down scoped set by list 322.

Next, any downscoped calculations declared in element ORDER are stored in all downscoped calculations 330 (445). Since there are no downscoped calculations declared in element ORDER, nothing is added to all downscoped calculations 330 (445).

Finally, the downscoped constraints declared by element ORDER are stored in an entry of all downscoped constraints 335 (450). There is one downscoped constraint declared by element ORDER. Namely, POSTAL CODE=US: DOWNSCOPE="SENDING/ADDR". The absolute qualified path node of ORDER[US], being resolvable to /ORDER [US] due to the depth-first traversal, is also recorded in the entry. Such information is used to determine whether the downscoped constraint is operative within a subsequently visited node, when the subsequently visited node's absolute qualified path can be resolved. Between this path, the already recorded absolute qualified path of the ORDER [US], and the relative path expression of the downscoping clause of the downscoped rule (e.g., SENDING/ADDR), it can be determined whether the rule has been downscoped to the subsequently visited node.

/ORDER[US]/LINE ITEM Nodes

The next node traversed and visited is a LINE ITEM node. It is determined that there is no type-qualified path entry for the type-qualified path /ORDER[US]/LINE ITEM (405), and therefore an entry is created.

The declared rules for the default state and default type of element LINE ITEM are then retrieved from the corpus of elements (410).

Of these retrieved rules, any constraints are stored in states/constraints 325 (415), and the calculations and respective targets are stored in calculations 315 and targets 310 (425), respectively.

In the case of the LINE ITEM node, there are no constraints stored in states/constraints 325 (415) and, consequently, no pointers elements stored in a state set by list 327 (420).

Next, the operative downscoped calculations are retrieved and added to the targets 310 and calculations 315 (430). Since all downscoped calculations 330 is empty, nothing is added (430) to calculations 315 and targets 310.

Next, the operative downscoped constraints are retrieved and added to down scoped constraints 320 (435) and down scoped set by list 322 (440). There is one downscoped constraint in all downscoped constraints 335. Namely, POSTAL CODE=US: DOWNSCOPE="SENDING/ ADDR" set by the previously visited node at absolute path /ORDER[US]. However, since the absolute path of the LINE ITEM node (i.e., /ORDER[US]/LINE ITEM) does not match the absolute path of the downscoped constraint (i.e., /ORDER[US]/SENDING/ADDR), nothing is added (435) to down scoped constraints 320 for the LINE ITEM nodes and nothing is added (440) to down scoped set by list 322 for the LINE ITEM nodes.

Next, any downscoped calculations declared in element LINE ITEM are stored in all downscoped calculations 330 (445). Since there are no downscoped calculations declared in element LINE ITEM, nothing is added to all downscoped calculations 330 (445).

Next, any downscoped constraints declared in element LINE ITEM are stored in all downscoped constraints 335 (450). Since there are no downscoped constraints declared in element LINE ITEM, nothing is added to all downscoped constraints 335 (450).

When the second LINE ITEM node is visited, it is determined that there is a type-qualified path entry for the type-qualified path /ORDER[US]/LINE ITEM (405). Hierarchical object rules collection for the node has been completed already.

TOT, AMT, DISC, PRICE, and QTY Nodes

All the children nodes of LINE ITEM—TOT, AMT, DISC, PRICE, and QTY—are scalar nodes. Therefore, no rules need to be collected for these nodes.

/OREDER[US]/LINE ITEM[DIGITAL] Node

When node LINE ITEM[DIGITAL] is visited, it is determined that there is no type-qualified path entry for the type-qualified path /ORDER[US]/LINE ITEM[DIGITAL] (405), and therefore an entry is created.

The declared rules for the default state and default type of element LINE ITEM and for the default state of type DIGITAL are then retrieved from the element corpus (410).

Of these retrieved rules, constraints are stored in states/ constraints 325 (415), and the calculations and the respective targets are stored (425) in calculations 315 and targets 310, respectively. Since there are no constraints set by LINE ITEM, no constraints are stored in states/constraints 325 (415) and no pointers to elements are stored in state set by list 327 (420).

Next, the operative downscoped calculations are retrieved and added to the targets 310 and calculations 315 (430). Since all downscoped calculations 330 is empty, nothing is added (430) to calculations 315 and targets 310.

Next, the operative downscoped constraints are retrieved and added to down scoped constraints 320 (435) and down scoped set by list 322 (440). There is one downscoped constraint in all downscoped constraints 335. Namely, POSTAL CODE=US: DOWNSCOPE="SENDING/ ADDR" set by the previously visited node at absolute path /ORDER[US]. However, since the absolute path of the LINE ITEM[DIGITAL] node (i.e., /ORDER[US]/LINE ITEM [DIGITAL]) does not match the absolute path of the downscoped constraint (i.e., /ORDER[US]/SENDING/ADDR), nothing is added (435) to down scoped constraints 320 for the LINE ITEM[DIGITAL] node and nothing is added (440) to down scoped set by list 322 for the LINE ITEM[DIGITAL] node.

Next, any downscoped calculations declared in element LINE ITEM are stored in all downscoped calculations 330

(445). Since there are no downscoped calculations declared in element LINE ITEM, nothing is added to all downscoped calculations 330 (445).

Next, any downscoped constraints declared in element LINE ITEM are stored in all downscoped constraints 335 (450). Since there are no downscoped constraints declared in element LINE ITEM, nothing is added to all downscoped constraints 335 (450).

/OREDER[US]/SENDING Node

When the SENDING node is visited, it is determined that there is no type-qualified path entry for the type-qualified path /ORDER[US]/SENDING (405), and therefore an entry is created.

The declared rules for the default state and default type of element SENDING are then retrieved from the element corpus (410).

The constraints are stored in states/constraints 325 (415), and the calculations and respective targets are stored in calculations 315 and targets 310, respectively (425). The rules for the state COMPLETE of element SENDING are retrieved and stored. Thus, rules ADDR IN STATE OF COMPLETE and NAME IS NON-NULL are stored in states/constraints 325. A pointer to the SENDING element is stored (420) in the state set by list 327 for the entry in states/constraints 325 for the COMPLETE state of the SENDING element.

/ORDER[US]/SENDING/ADDR Node

When the child node ADDR of parent node SENDING is visited, it is determined that there is no type-qualified path entry for the type-qualified path /ORDER[US]/SENDING/ADDR (405), and therefore an entry is created.

The declared rules for the default state of the default type of element ADDR are then retrieved from the element corpus (410). The constraints are stored in states/constraints 325 (415), and the calculations and the respective targets are stored in calculations 315 and targets 310 (420), respectively. The rules for the state COMPLETE of element ADDR are retrieved and stored. Thus, rules STREET IS NON-NULL, NAME IS NON-NULL, and POSTAL CODE IS NON-NULL are stored in states/constraints 325. A pointer to the ADDR element is stored (420) in the state set by list 327 for the entry in states/constraints 325 for the COMPLETE state of the SENDING element.

The operative downscoped constraints are retrieved and added to down scoped constraints 320 (435) and down scoped set by list 322 (440). There is one downscoped constraint in all downscoped constraints 335. Namely, POSTAL CODE=US: DOWNSCOPE="SENDING/ADDR" set by the previously visited node at absolute path /ORDER[US]. Since the absolute path of the /ORDER[US]/SENDING/ADDR matches the absolute path of the downscoped constraint (i.e., /ORDER[US]/SENDING/ADDR), the downscoped constraint POSTAL CODE=US added (435) to down scoped constraints 320 for the /ORDER[US]/SENDING/ADDR entry and a pointer to the ORDER element is added (440) to down scoped set by list 322.

Scheduling Calculations

Figure 5:
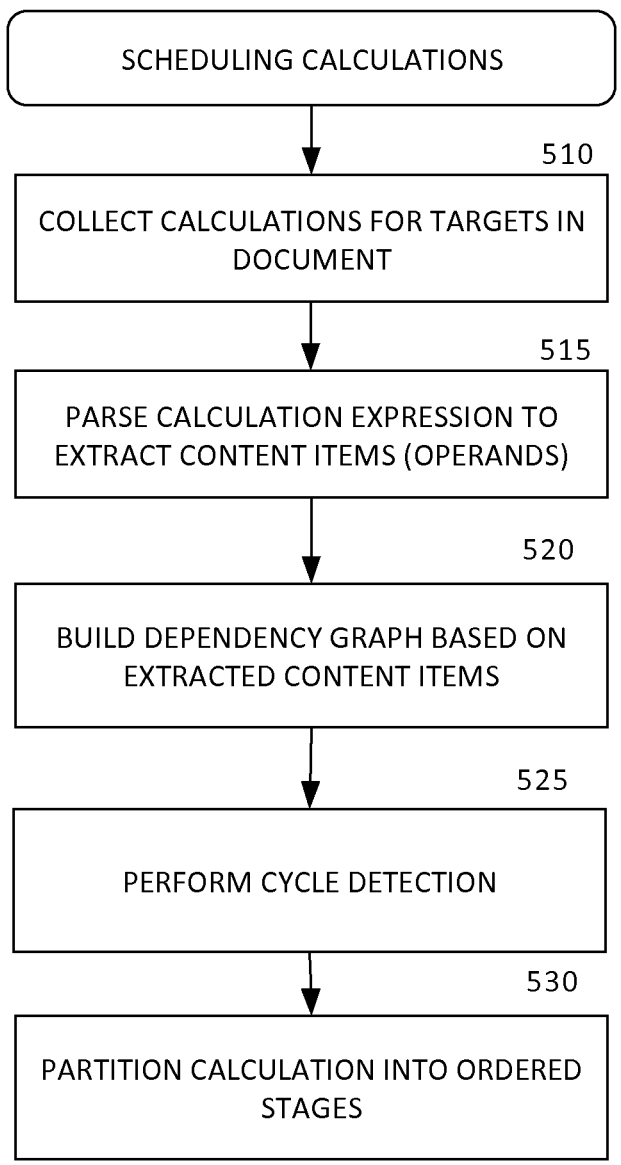
FIG. 5 is a diagram outlining a technique for scheduling rules according to an embodiment.

Validation of a hierarchical object includes scheduling of calculations collected during hierarchical object rules collection. Scheduling calculations for a hierarchical object includes (1) defining a sequence in which calculations are executed properly, and (2) detecting any situation that would make it impossible to determine a proper sequence of execution. FIG. 5 summarizes a technique for accomplishing these goals according to an embodiment of the present invention.

Referring to FIG. 5, the calculations for the targets in a hierarchical object are gathered (510). In an embodiment, calculations can be gathered using the hierarchical object rules collection technique described above, although an embodiment is not limited to collecting rules in this way. The calculation expressions are parsed to extract the operands (515).

A calculation may depend on the result of another calculation. A dependency graph is built to reflect such dependencies between the gathered calculations (520). The cycle detection is performed using the dependency graph (525). The detection of least one cycle indicates an error.

Finally, the calculations are partitioned into schedule stages, ordered from early to later schedule stages (530). The partitioning is performed such that no dependent calculation belongs to the same or earlier schedule stage than a calculation upon which the dependent calculation depends, as shall be explained in further detail.

Extracting Dependencies and Building Dependency Graph

To build the dependency graph, each of the calculation expressions collected in the hierarchical object rules collection structures are parsed to determine the operands. The operands and targets are fully qualified by their respective type-qualified path. A "target node" is generated for each target of a calculation, and thus a target node not only represents a target but the calculation. For each particular target having a calculation expression operand resolving to another target, a directed arc is established from the particular target's node to the other's target's node. As a result, for each dependent calculation listed in a calculations 315, there is an arc from a respective target node of the dependent calculation to the respective target node of the calculation upon which the dependent calculation depends.

Figure 6:
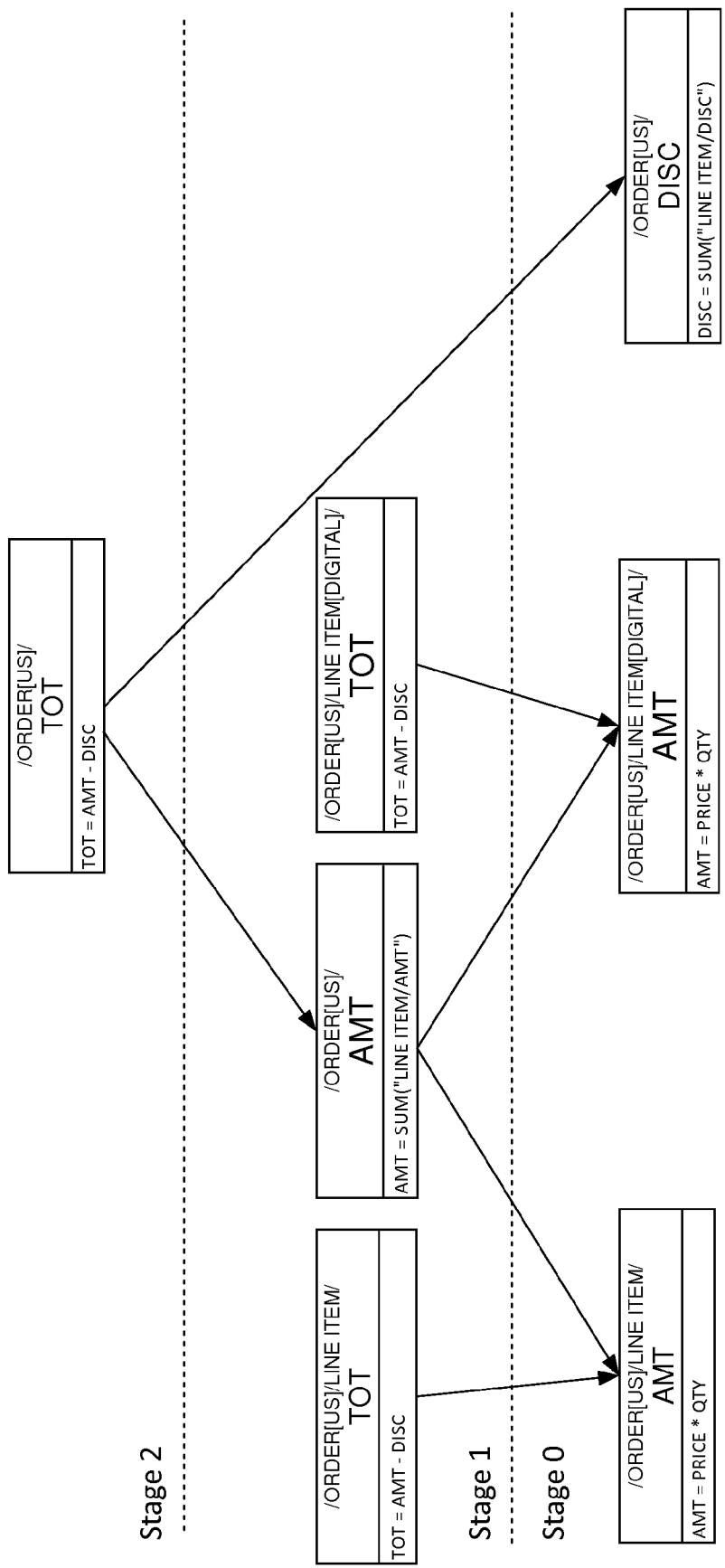
FIG. 6 is a diagram depicting a dependency graph according to an embodiment.

To illustrate, FIG. 6 shows a dependency graph for calculations collected during hierarchical object rules collection performed for ORDER[US].

Referring to FIG. 6, the dependency graph is a directed graph comprising target nodes. Each target node is annotated with its target, type-qualified path, and calculation. A target node in FIG. 6 is referred to herein using the type-qualified path of the target node and the targets name. Thus, TOT of /ORDER[US] refers to the node at the very top of the dependency graph 601.

The dependency graph is generated by examining and analyzing the rules collected in the hierarchical object rules collection data structures 301 during hierarchical object rules collection. The type-qualified path entry /ORDER[US] contains the calculation TOT=AMT−DISC, AMT=SUM ("LINE ITEM/AMT"), DISC=SUM("LINE ITEM/DISC"), the targets of which are TOT, AMT, DISC, respectively. Target node TOT of ORDER[US] is qualified by type-qualified path /ORDER[US] and represents the target TOT. Similarly target node AMT of ORDER[US] is qualified by /ORDER[US] represents the target of calculation AMT=SUM("LINE ITEM/AMT"), and DISC of ORDER [US] is qualified by /ORDER[US] and represents the target of calculation DISC=SUM("LINE ITEM/DISC").

Note there are two instances of the same calculation and target declared by element LINE ITEM. This is a result having the same element LINE ITEM qualified by separate type-qualified paths /ORDER[US]/LINE ITEM and /ORDER[US]/LINE ITEM[DIGITAL] in type-qualified paths 305. Target node AMT of /ORDER[US]/LINE ITEM represents the target of calculation AMT=PRICE*QTY and target node AMT of /ORDER[US]/LINE ITEM[DIGITAL] represents the target of calculation AMT=PRICE*QTY. Similarly, target node TOT of /ORDER[US]/LINE ITEM represents the target of calculation TOT=AMT−DISC and target node TOT of /ORDER[US]/LINE ITEM[DIGITAL] represents the target of calculation TOT=AMT−DISC.

An arc directed from a first target node to a second target node represents that the calculation of the first target node is dependent on the calculation of the second target node. For example, there is a directed arc from AMT of /ORDER[US] to AMT of /ORDER[US]/LINE ITEM, representing that calculation AMT=SUM("LINE ITEM/AMT") is dependent on the calculation AMT=PRICE*QTY.

Determining dependencies between calculations entails parsing calculations in type-qualified paths 305 to extract operands and to determine whether each operand is a target of another calculation. This determination is made after resolving the hierarchical object hierarchical contexts of the operands and targets to a type-qualified path.

For example, the type-qualified path entry for /ORDER[US] includes target AMT for calculation SUM("LINE ITEM/AMT") and the type-qualified path entry for /ORDER[US]/LINE ITEM includes the calculation AMT=PRICE*QTY. After resolving the targets and operands to the respective type-qualified paths, it is determined operand /ORDER[US]/LINE ITEM/AMT in calculation SUM("LINE ITEM/AMT") is also the target /ORDER[US]/LINE ITEM/AMT for the calculation AMT=PRICE*QTY.

Partitioning into Schedule Stages

Based on the dependency graph, the calculations are partitioned into schedule stages in a manner that is dependency consistent, that is, a dependent calculation is at a later stage than the calculation depended upon. This partitioning is accomplished by partitioning targets nodes in the dependency graph based on the dependencies represented by the graph. Each target node is marked with the schedule stage determined for the target node, thereby establishing a schedule stage for the target node's corresponding calculation. The calculation is referred to herein as being scheduled for the schedule stage established for the calculation.

FIG. 6 shows how the target nodes are partitioned into schedule stages. Schedule stage 2 is the latest stage and schedule stage 0 is the earliest stage. Target node TOT of /ORDER[US] is marked with schedule stage 2; the calculation TOT=AMT−DISC is scheduled for schedule stage 2. Target node AMT of /ORDER[US]/LINE ITEM is marked with the stage 1; the calculation AMT=PRICE*QTY (in type-qualified path entry /ORDER[US]/LINE ITEM) is earlier scheduled for schedule stage 0.

When the calculations are computed during validation, a calculation may be executed in any order with respect to any other calculation scheduled for the same schedule stage. However, the calculation is computed after any calculation scheduled for an earlier scheduled stage and before any calculation scheduled for a later schedule stage.

According to an embodiment, a calculation is scheduled in the earliest stage possible that maintains dependency consistency. Thus, a dependent calculation may be scheduled one or more stages later than the calculation upon which the dependent calculation immediately depends. For example, the dependent calculation TOT=AMT−DISC (see TOT of /ORDER[US]/) is scheduled for stage 2, while the calculation upon which it depends, DISC=SUM("LINE ITEM/DISC") is scheduled for stage 0.

FIG. 7 shows pseudo-code of an algorithm for determining schedule stages of target nodes and marking the target nodes with a schedule stage. In the pseudo-code, the term calculation refers to a target node in a dependency graph, such as the dependency graph of FIG. 6, because each target node logically represents a calculation. Line numbering in FIG. 7 numbers each line of pseudo code. The operation of blocks of lines of pseudo-code is explained by referring to the line number of the first line in the block.

The function schedule( ) is invoked (701). The schedule stage of each calculation is initialized to −1 (701). The recursive function scheduleRec(calc) is called for each calculation (706), beginning with any calculation in the dependency graph. The function scheduleRec(calc) (710) leaves the respective calculation marked with the schedule stage determined for the calculation, and returns the schedule stage.

When scheduleRec(calc) is invoked for a calculation ("current calculation"), if the current target node is already marked with a non-negative schedule stage (712), that schedule stage is returned. Otherwise, if the current calculation has no child dependents in the dependency graph, the current calculation is marked with schedule stage 0 (714).

Otherwise, for each calculation on which the current node depends ("dependency"), scheduleRec(calc) is invoked and returns the schedule stage of the dependency (721). If the stage of the current calculation is less the schedule stage that follows that of the dependency, then the current calculation's stage is set to the schedule stage that follows (722).

Error Propagation of Nodes Failures During Validation Traversal

During the validation traversal, when a node fails to satisfy a constraint that applies to the node, the failure is propagated towards the root node taking into account multiple ancestries of rules with downscoping and open content nodes. The failure reaches the root node only if there are constraints linking the failed node to the root node. If such linkage is not present, then the root node is not failed. For example, if the failed node is an open content node, then failure is not propagated to the root node.

The down scoped set by list 322, the down scoped failed instances list 323, the state set by list 327, and the state failed instances list 328 are used during the validation traversal to appropriately propagate node failures towards the root node taking into account multiple ancestries of rules with downscoping and open content nodes.

Figure 8:
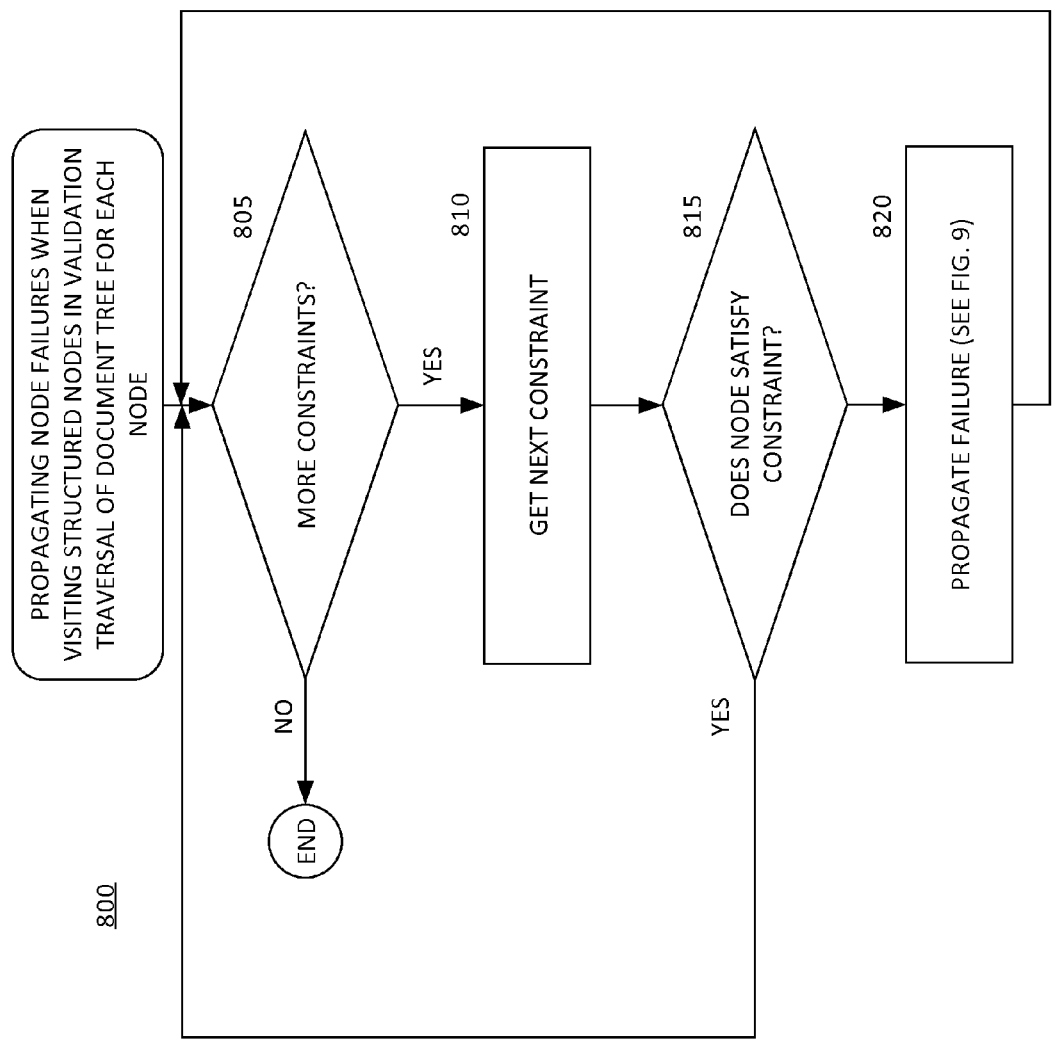
FIG. 8 is a flow chart that illustrates a method for propagating node failures towards the root node during the validation traversal according to an embodiment.

FIG. 8 is a flow chart 800 that illustrates a method for propagating node failures towards the root node taking into account multiple ancestries of constraints with down scoping and open content nodes according to an embodiment. The illustrated method is but one example of a technique for propagating node failures. Other techniques may feature more or fewer steps, in different arrangements The steps of the method are performed for each structured node visited during the validation traversal. Not all steps of the method may be performed for every visited node and only some of the steps of the method may be performed for some of the visited node. For example, only step 805 is performed for a visited node that does not have any constraints that apply to it.

At step 805, the rules collection data structures 301 populated during the rules collection traversal are consulted. The rules collection data structures are consulted to determine if there are any more states/constraints 325 or down scoped constraints 320 that apply to the visited node that have not already been evaluated against the visited node.

For example, for the ADDR node of hierarchical object ORDER of FIG. 2 at absolute path /ORDER[US]/SENDING/ADDR, if the ADDR node is in the COMPLETE state, then the ADDR node is evaluated against the states/constraints 325 STREET IS NON-NULL, NAME IS NON-NULL, POSTAL CODE IS NON-NULL. In addition, regardless of what state the ADDR node is in, the ADDR node is evaluated against the down scoped constraint 320 POSTAL CODE=US.

If, at step 805, there are more constraints to evaluate for the visited node, then the method proceeds to step 810. At step 810, the next constraint is obtained. Otherwise, if there are no more constraints to evaluate for the visited node at step 805, then the validation traversal continues in the depth-first manner to the next visited node.

At step 815, the visited node is evaluated against the next constraint. If, at step 815, the visited node satisfies the constraint, then the method returns to step 805 to determine if there is another constraint to evaluate the visited node against.

If, on the other hand, the visited node does not satisfy the constraint at step 815, then the method proceeds to step 820, where the failure is propagated towards the root node taking into account multiple ancestries of rules with downscoping and open content nodes. If the failure reaches the root node, then the root node, and hence, the hierarchical object is invalid. The failure may not reach the root node if the visited node is an open content node or there is an ancestor open content node between the visited node and the root node that stops the propagation of the failure towards the root node.

Recursive Algorithm for Rule Failure Propagation

As mentioned above, rule checking during the validation traversal is instance based. That is, the nodes of the hierarchical object are traversed in depth-first order, and each visited node is checked against the rules that apply to it. A visited node is one of two kinds: scalar or structured.

Scalar nodes are checked against their declared data type. For example, if a scalar node declares itself to be an instance of a NAME element and the NAME element is defined as a string type, then the value of the scalar node is checked for a string data type (e.g., a sequence of UTF8 encoded Unicode characters). If a scalar node fails type checking, the failure is propagated toward the root node only if the parent node of the scalar node has a constraint specifying the scalar node as a child node of the parent node. Otherwise the scalar node is an open content node. If the scalar node is an open content node and the scalar node fails type checking, the failure may be reported by the validation process, but the failure by itself does not cause the root node or the hierarchical object to fail.

A structured node is checked against the rule or rules collected during the rules collection traversal that apply to it. These rules are stored in the down scoped constraints 320 and states/constraints 325 for the corresponding type-qualified path entry 305. Each rule in down scoped constraints 320 and states/constraints 325 may be associated with an error flag which is updated when a node is checked against the rule during the validation traversal.

FIG. 9 shows pseudo-code of an algorithm for updating the error flag associated with a rule during the validation traversal. The error flag for a rule in down scoped constraints 320 or states/constraints 325 keeps track during the validation traversal of three different states of the rule during the traversal. A first state is that the rule has never been checked against a node during the validation traversal. A second state is that the rule has been checked against a node during the validation traversal and the node satisfied the rule. A third state is that at least one node failed the rule during the validation traversal. At the end of the validation traversal, the error flag for the rule will be in the second state (checked and passed) only if all nodes against which the rule was checked satisfied the rule. If any one of those nodes did not satisfy the rule, then the error flag for the rule will be in the third state (checked and failed) at the end of the validation traversal. A reason for distinguishing between when a rule has never been checked and when it has been checked and passed is that some rules may be checked against all nodes to which the rules apply when the first instance of the node is encountered during the validation traversal. The error flag prevents rechecking the nodes when the second and subsequent instances are encountered during the validation traversal.

If a node fails a rule, the node (or a pointer or reference to the node) is added to the down scoped failed instances list 323 corresponding to the rule, if the failed rule is a down scoped constraint 320, or added to the state failed instances 328 list corresponding to the rule, if the failed rule is a states/constraints 325. The corresponding down scoped set by list 322, if the failed rule is a down scoped constraint 320, or the corresponding state set by list 327, if the failed rule is a states/constraints 325, is followed, element by element, to update all such elements by adding the now failing node to their lists (323 or 328) of failing instances. The down scoped set by list 322 and the state set by list 327 are lists because more than one element may set the same rule, so at every step of the recursive rule failure propagation algorithm, all links are followed. At each step, the algorithm may encounter either a states/constraints 325 rule or a down scoped constraint 320 rule and sets the error flag for the rule to checked and failed. The algorithm may fail ancestor nodes of the originally failed node closer and closer to the root node and will fail the root node if the originally failed node is not an open-content node. If the originally failed node is an open content node, the root node may still fail if some descendant node of the root node that is an ancestor of the originally failed node and that is not an open content node fails.

FIG. 10 shows pseudo-code of a recursive algorithm for propagating node failures toward the root node taking into account multiple ancestries and open content nodes. Line numbering in FIG. 10 numbers each line of pseudo code. The method may be performed to implement step 815 of the method of FIG. 8.

At each invocation of the errorBackProp method, the method follows two sequences. One sequence is a set of setBy elements (1003). The set of set by elements is either a down scoped set by list 322 or a state set by list 327. The other sequence is the sequence of the set of nodes in the hierarchical object that match each setBy element's full path and that are ancestors to the failed node (1005).

When first invoked when a node fails a rule, the first argument, thisElement, to the errorBackProp method (1001) is a pointer to the element corresponding to the failed node. The second argument, rule, to the errorBackProp method (901) is a pointer to the failed rule. The third argument, thisNode, is a pointer to the failed node.

The errorBackProp method loops (1003-1010) through the list of all elements that set the failed rule. For each element, the function findAncestorNode (1005) is called. The findAncestorNode function returns (1005) a pointer to the node in the hierarchical object that is the ancestor of the current node matching the metadata of the setByElement.

For each setByElement, the function findAncestorRule is also called (1006). The findAncestorRule function finds the rule that set the currently failing rule, since each element may have multiple rules. Then, in the metadata element found, setByElement, the errorBackProp function adds (1007) the found instance, setByNode, to the list of failing, INList, instances for the specific rule, setByRule, and sets (1008) the error flag.

Since this rule in the ancestor may have been set by another element further up in the hierarchy, the errorBackProp function is called (1009) recursively. This time the failing node passed as the third argument, thisNode, to the errorBackProp function is the ancestor of the originally failing node. The recursion stops whenever the setBy list for some element is empty, meaning that the failed rule was not down scoped and did not belong to a downscoped or sub-element-ed state, but instead originated in the state definition of the element itself.

The recursive algorithm is efficient in the sense that only pointers to nodes as well as to elements are stored in the document rules collection data structures 301, thereby minimizing memory footprint. The recursive algorithm is also efficient in the sense that the recursion only updates elements that need to be updated.

Implementation Mechanisms

Claimed embodiments of techniques and mechanisms described herein are implemented on computer systems, and are preferably used in environments to validate a voluminous number of complex hierarchical objects. As a practical matter, the use of a computer system in claimed embodiments is required. The techniques should not be construed in any way as being amendable to being performed mentally or manually. Example computer systems that may be used to implement an embodiment include the computer systems described in this section and the servers configured to execute XAP applications described in the related U.S. patent application Ser. No. 12/782,591, filed on May 18, 2010, the entire content of which is incorporated by reference as if fully set forth herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
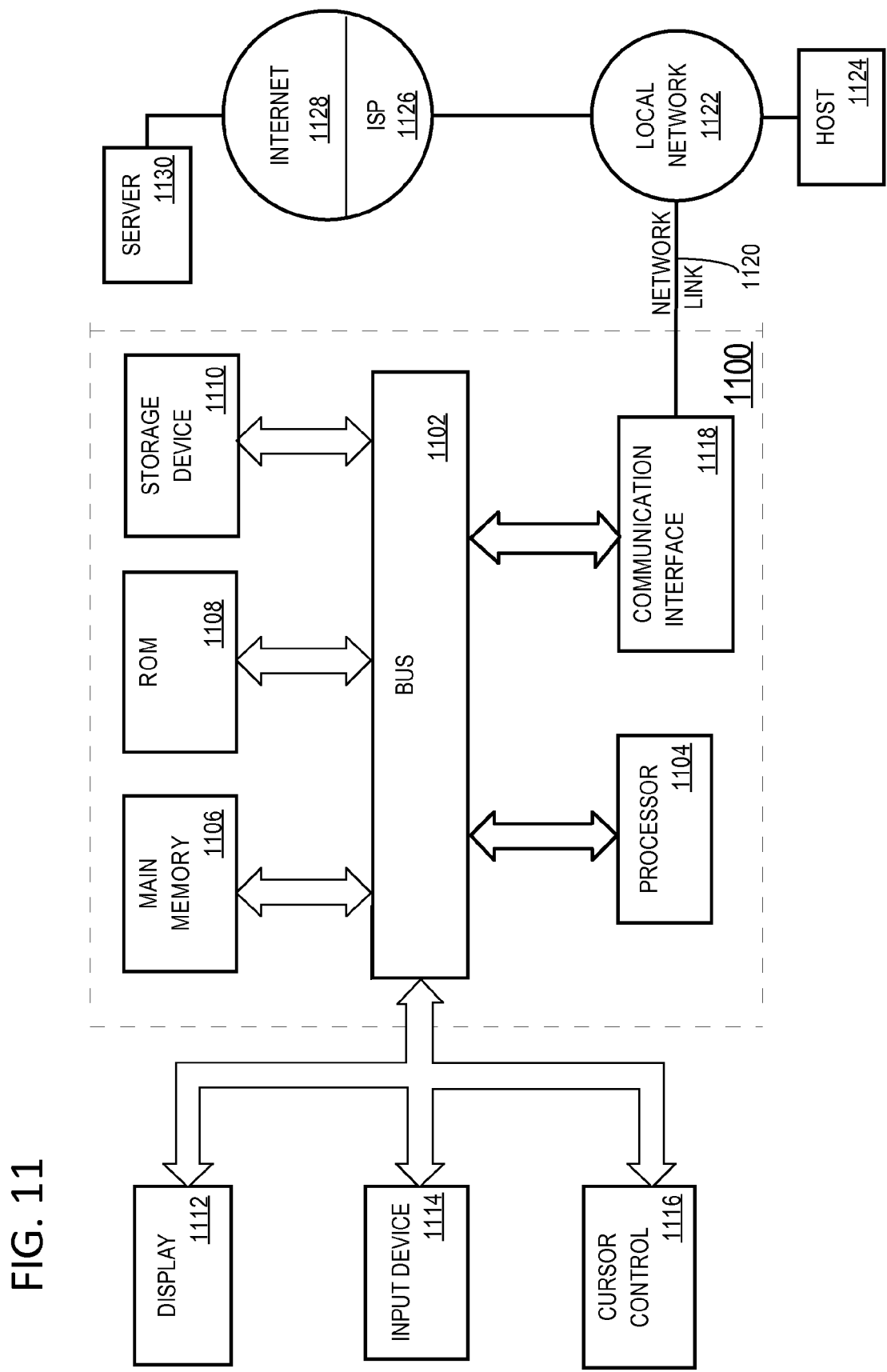
FIG. 11 is a diagram depicting a computer system that may be used in an embodiment.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
   storing a hierarchical object in computer memory, the hierarchical object having a first plurality of nodes arranged in a hierarchy, the first plurality of nodes having exactly one root node, and wherein every node of the first plurality of nodes other than the root node has exactly one parent node that is one of the first plurality of nodes;
   storing a corpus of elements in computer memory, wherein each element of the corpus of elements is associated with a set of rules;
   for each node of at least one node of the first plurality of nodes:
   (a) determining an element of the corpus of elements that the node is an instance of,
   (b) based at least on a hierarchical context of the node, whether the node is an open-content node, and the set of rules associated with the element that the node is an instance of, determining one or more rules that apply to the node and adding the one or more rules to a collection of rules for the hierarchical object,
   (c) performing an evaluation of the node against at least one of the one or more rules that apply to the node,
   (d) based on results of the evaluation of the node, determining whether the node is valid or invalid, and
   (e) when the node is invalid, determining if invalidity of the node does not cause at least one ancestor node of the node to also be invalid because the rules added to the collection of rules includes a constraint linking the node to the at least one ancestor node;
   wherein the method is performed by one or more computing devices.

2. The method of claim 1, wherein the collection of rules includes a downscoped rule.

3. The method of claim 1, wherein, for each of the second plurality of nodes, (a) and (b) are performed during a first traversal of the second plurality of nodes and (c), (d), and (e) are performed during a second subsequent traversal of the second plurality of nodes.

4. The method of claim 3, wherein the first traversal and the second subsequent traversal are each a depth-first traversal of the second plurality of nodes.

5. The method of claim 1, wherein (b) determining the one or more rules that apply to the node includes determining whether any downscoped rules set by ancestors of the node apply to the node based at least in part on the hierarchical context of the node.

6. The method of claim 1, wherein (a) determining the element of the corpus of elements that the node is an instance of includes determining a declared name of the node.

7. The method of claim 1, further comprising determining that the hierarchical object is invalid only if the root node is determined to be invalid, even if one or more other nodes of the hierarchical object are determined to be invalid.

8. The method of claim 1,
wherein at least one invalid node is an open-content node that does not need to conform to a schema of the hierarchical object for the hierarchical object to be considered valid.

9. The method of claim 1, wherein (e) when the node is invalid, determining if invalidity of the node causes any ancestor node of the node to also be invalid includes:
obtaining a particular ancestor node of the node to which a particular rule applies, the particular rule comprising a particular constraint requiring the node to be valid for the particular ancestor node to be valid;
determining that the particular constraint is not satisfied;
determining whether the particular ancestor node is invalid; and
if the particular ancestor node is invalid, determining if invalidity of the particular ancestor node causes any ancestor node of the particular ancestor node to also be invalid.

10. The method of claim 1, wherein the hierarchical object is an eXtensible Markup Language (XML) document.

11. The method of claim 1, wherein the first plurality of nodes includes one or more scalar nodes and wherein the second plurality of nodes does not include the one or more scalar nodes.

12. One or more non-transitory computer-readable media storing one or more sequences of instructions which, when executed by one or more computing devices, cause:
storing a hierarchical object in computer memory, the hierarchical object having a first plurality of nodes arranged in a hierarchy, the first plurality of nodes having exactly one root node, and wherein every node of the first plurality of nodes other than the root node has exactly one parent node that is one of the first plurality of nodes;
storing a corpus of elements in computer memory, wherein each element of the corpus of elements is associated with a set of rules;
for each node of a second plurality of nodes of the first plurality of nodes:
(a) determining an element of the corpus of elements that the node is an instance of,
(b) based at least on a hierarchical context of the node, whether the node is an open-content node, and the set of rules associated with the element that the node is an instance of, determining and adding one or more rules that apply to the node to a collection of rules for the hierarchical object,
(c) performing an evaluation of the node against at least one of the one or more rules that apply to the node,
(d) based on results of the evaluation of the node, determining whether the node is valid or invalid, and
(e) when the node is invalid, determining if invalidity of the node does not cause at least one ancestor node of the node to also be invalid because the rules added to the collection of rules includes a constraint linking the node to the at least one ancestor node.

13. The one or more non-transitory computer-readable media of claim 12, wherein the collection of rules includes a downscoped rule.

14. The one or more non-transitory computer-readable media of claim 12, wherein the one or more sequences of instructions include instructions that, when executed by said one or more computing devices, cause, for each of the second plurality of nodes, (a) and (b) are performed during a first traversal of the second plurality of nodes and (c), (d), and (e) are performed during a second subsequent traversal of the second plurality of nodes.

15. The one or more non-transitory computer-readable media of claim 14, wherein the first traversal and the second subsequent traversal are each a depth-first traversal of the second plurality of nodes.

16. The one or more non-transitory computer-readable media of claim 12, wherein (b) determining the one or more rules that apply to the node includes determining whether any downscoped rules set by ancestors of the node apply to the node based at least in part on the hierarchical context of the node.

17. The one or more non-transitory computer-readable media of claim 12, wherein (a) determining the element of the corpus of elements that the node is an instance of includes determining a declared name of the node.

18. The one or more non-transitory computer-readable media of claim 12, wherein the one or more sequences of instructions include instructions that, when executed by said one or more computing devices, cause;
determining that the hierarchical object is invalid only if the root node is determined to be invalid.

19. The one or more non-transitory computer-readable media of claim 12,
wherein at least one invalid node is an open-content node that does not need to conform to a schema of the hierarchical object for the hierarchical object to be considered valid.

20. The one or more non-transitory computer-readable media of claim 12, wherein (e) when the node is invalid, determining if invalidity of the node causes any ancestor node of the node to also be invalid includes:
obtaining a particular ancestor node of the node to which a particular rule applies, the particular rule comprising a particular constraint requiring the node to be valid for the particular ancestor node to be valid;
determining that the particular constraint is not satisfied;
determining whether the particular ancestor node is invalid; and
if the particular ancestor node is invalid, determining if invalidity of the particular ancestor node causes any ancestor node of the particular ancestor node to also be invalid.

21. The one or more non-transitory computer-readable media of claim 12, wherein the hierarchical object is an eXtensible Markup Language (XML) document.

22. The one or more non-transitory computer-readable media of claim 12, wherein the first plurality of nodes includes one or more scalar nodes and wherein the second plurality of nodes does not include the one or more scalar nodes.

23. A system comprising:
computer memory;
one or more processors;
one or more non-transitory computer-readable media storing instructions that, when executed by the one or more processors, cause:
storing a hierarchical object in computer memory, the hierarchical object having a first plurality of nodes arranged in a hierarchy, the first plurality of nodes having exactly one root node, and wherein every node of the first plurality of nodes other than the root node has exactly one parent node that is one of the first plurality of nodes;

storing a corpus of elements in computer memory, wherein each element of the corpus of elements is associated with a set of rules;

for each node of a second plurality of nodes of the first plurality of nodes:
  (a) determining an element of the corpus of elements that the node is an instance of,
  (b) based at least on a hierarchical context of the node, whether the node is an open-content node, and the set of rules associated with the element that the node is an instance of, determining and adding one or more rules that apply to the node to a collection of rules for the hierarchical object,
  (c) performing an evaluation of the node against at least one of the one or more rules that apply to the node,
  (d) based on results of the evaluation of the node, determining whether the node is valid or invalid, and
  (e) when the node is invalid, determining if invalidity of the node does not cause at least one ancestor node of the node to also be invalid because the rules added to the collection of rules includes a constraint linking the node to the at least one ancestor node.

* * * * *

UNITED STATES PATENT AND TRADEMARK OFFICE
CERTIFICATE OF CORRECTION

PATENT NO.       : 9,582,488 B2
APPLICATION NO.  : 13/770200
DATED            : February 28, 2017
INVENTOR(S)      : Di Blas et al.

It is certified that error appears in the above-identified patent and that said Letters Patent is hereby corrected as shown below:

On the Title Page

On page 2, Column 2, under Other Publications, Line 3, delete "Aciton," and insert -- Action, --, therefor.

On page 2, Column 2, under Other Publications, Line 17, delete "Corpora" and insert -- Corporate --, therefor.

In the Specification

In Column 8, Line 21, after "below" insert -- . --.

In Column 8, Line 43, after "elements" insert -- . --.

In Column 9, Line 38, after "calculations" insert -- . --.

In Column 10, Line 3, after "CODE" insert -- . --.

In Column 11, Line 3, after "paths" insert -- . --.

In Column 13, Lines 5-6, after "operative" insert -- . --.

In Column 16, Line 26, after "path" insert -- . --.

In Column 18, Line 32, delete "/OREDER" and insert -- /ORDER --, therefor.

In Column 19, Line 10, delete "/OREDER" and insert -- /ORDER --, therefor.

Signed and Sealed this
Twenty-second Day of August, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,582,488 B2

In Column 22, Line 60, after "arrangements" insert -- . --.

In Column 25, Line 25, delete "subelement-ed" and insert -- sub-elemented --, therefor.

In the Claims

In Column 30, Line 22, in Claim 18, delete "cause;" and insert -- cause: --, therefor.